(12) United States Patent
Jung et al.

(10) Patent No.: US 12,170,397 B2
(45) Date of Patent: Dec. 17, 2024

(54) ELECTRONIC DEVICE INCLUDING ANTENNA MODULE

(71) Applicant: Samsung Electronics Co., Ltd., Suwon-si (KR)

(72) Inventors: Hojin Jung, Suwon-si (KR); Yongyoun Kim, Suwon-si (KR); Hyunbum Kim, Suwon-si (KR); Myeongsu Oh, Suwon-si (KR); Duho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 17/966,156

(22) Filed: Oct. 14, 2022

(65) Prior Publication Data

US 2023/0043277 A1 Feb. 9, 2023

Related U.S. Application Data

(63) Continuation of application No. PCT/KR2021/004298, filed on Apr. 6, 2021.

(30) Foreign Application Priority Data

Apr. 14, 2020 (KR) .................. 10-2020-0045397

(51) Int. Cl.
*H01Q 1/24* (2006.01)
*H01Q 3/36* (2006.01)
(Continued)

(52) U.S. Cl.
CPC ............... *H01Q 1/243* (2013.01); *H01Q 3/36* (2013.01); *H01Q 9/0407* (2013.01); *H01Q 9/16* (2013.01); *H04M 1/0216* (2013.01); *H04M 1/026* (2013.01)

(58) Field of Classification Search
CPC ............ H01Q 1/24; H01Q 1/243; H01Q 1/22; H01Q 21/00; H01Q 21/28; H01Q 3/36;
(Continued)

(56) References Cited

U.S. PATENT DOCUMENTS

| 6,125,451 | A | 9/2000 | Fukunaga |
| 6,246,374 | B1 * | 6/2001 | Perrotta ................. H01Q 1/242 343/702 |

(Continued)

FOREIGN PATENT DOCUMENTS

| CN | 107949194 A | 4/2018 |
| KR | 10-2014-0105886 A | 9/2014 |

(Continued)

OTHER PUBLICATIONS

Korean Office Action dated Aug. 5, 2024, issued in Korean Application No. 10-2020-0045397.

*Primary Examiner* — Tho G Phan
(74) *Attorney, Agent, or Firm* — Jefferson IP Law, LLP

(57) ABSTRACT

An electronic device is provided. The electronic device includes a first part, a second part, a connection part disposed and coupled to the first part and the second part such that the first part and the second part are rotatable, a first antenna module disposed in the first part and includes an antenna array, a second antenna module disposed in the second part and includes an antenna array, a processor disposed in the first part, an IFIC disposed in the first part and electrically connected to the first antenna module and the processor, a second IFIC disposed in the second part and electrically connected to the second antenna module and the processor and an FPCB disposed over the first part, the connection part, and the second part, and is configured to transfer a digital signal or a baseband I/Q signal between the processor and the second IFIC.

20 Claims, 13 Drawing Sheets

(51) Int. Cl.
*H01Q 9/04* (2006.01)
*H01Q 9/16* (2006.01)
*H04M 1/02* (2006.01)

(58) Field of Classification Search
CPC .......... H01Q 9/04; H01Q 9/0407; H01Q 9/16; H04M 1/02; H04M 1/0214; H04M 1/0216; H04M 1/026; H04B 1/00; H04B 1/40
See application file for complete search history.

(56) References Cited

U.S. PATENT DOCUMENTS

| | | | |
|---|---|---|---|
| 10,062,954 | B2 | 8/2018 | Hong et al. |
| 10,079,425 | B2 | 9/2018 | Chun et al. |
| 10,193,213 | B2 | 1/2019 | Liu |
| 10,389,412 | B2 | 8/2019 | Gharavi et al. |
| 10,797,405 | B1 | 10/2020 | Baek et al. |
| 11,228,336 | B2 | 1/2022 | Lee |
| 11,616,865 | B2 | 3/2023 | Jeong et al. |
| 11,848,500 | B2 * | 12/2023 | Yeom ............... H01Q 1/243 |
| 11,901,610 | B2 * | 2/2024 | Kim ............... H04M 1/0218 |
| 11,902,457 | B2 * | 2/2024 | Jin ............... H04M 1/0214 |
| 11,936,099 | B2 * | 3/2024 | Lee ............... H01Q 21/28 |
| 11,955,691 | B2 * | 4/2024 | Cha ............... H01Q 1/48 |
| 2018/0324964 | A1 | 11/2018 | Yoo et al. |
| 2019/0198976 | A1 | 6/2019 | Kim et al. |
| 2019/0207666 | A1 | 7/2019 | Son et al. |
| 2020/0194904 | A1 | 6/2020 | Huh et al. |
| 2021/0328329 | A1 | 10/2021 | Kim et al. |
| 2021/0344783 | A1 | 11/2021 | Jeong et al. |
| 2022/0200640 | A1 | 6/2022 | Kim et al. |

FOREIGN PATENT DOCUMENTS

| | | |
|---|---|---|
| KR | 10-2019-0026449 A | 3/2019 |
| KR | 10-2019-0073856 A | 6/2019 |
| KR | 10-2020-0024500 A | 3/2020 |
| KR | 10-2020-0025439 A | 3/2020 |
| KR | 10-2020-0028256 A | 3/2020 |

* cited by examiner

ELECTRONIC DEVICE INCLUDING ANTENNA MODULE

CROSS-REFERENCE TO RELATED APPLICATION(S)

This application is a continuation application, claiming priority under § 365(c), of an International application No. PCT/KR2021/004298, filed on Apr. 6, 2021, which is based on and claims the benefit of a Korean patent application number 10-2020-0045397, filed on Apr. 14, 2020, in the Korean Intellectual Property Office, the disclosure of which is incorporated by reference herein in its entirety.

BACKGROUND

1. Field

The disclosure relates to an electronic device including an antenna module. More particularly, the disclosure relates to an electronic device including an antenna module antenna module for reducing a loss of a transmitted and received signal.

2. Description of Related Art

Due to rapidly increasing mobile traffic, 5th generation (5G) technologies based on a high-band frequency are developing. A high-band frequency signal may include millimeter waves having a frequency band of 20 gigahertz (GHz) to 300 GHz.

A mobile device of a bar type may include a plurality of high frequency (for example, millimeter wave (mmWave)) antenna modules for transmitting and receiving a high frequency (for example, millimeter waves). For example, the high frequency antenna modules may be disposed on a left portion, a middle portion, and a right portion of the terminal by considering performance and usability of a user.

However, as technologies of mobile devices of bar types have limitations, there is a growing expectation for foldable electronic devices. A housing of a foldable electronic device may include a first part, a second part, and a connection part connecting the first part and the second part. The foldable electronic device activates a folding operation with the first part and the second part being rotated with reference to the connection part. The foldable electronic device may also include a plurality of high frequency antenna modules for 5G communication. For example, the foldable electronic device may include two high frequency antenna modules which are disposed on a left portion and an upper end of the first part, and one high frequency antenna module which is disposed on a right portion of the second part. An intermediate frequency integrated circuit (IFIC) of the first part and the high frequency antenna module of the second part may perform communication through a flexible radio frequency cable (FRC) or a coaxial cable passing through the connection part.

The above information is presented as background information only to assist with an understanding of the disclosure. No determination has been made, and no assertion is made, as to whether any of the above might be applicable as prior art with regard to the disclosure.

SUMMARY

When an IF signal having a frequency of about 10 GHz is transmitted and received between the IFIC of the first part and the high frequency (for example, mmWave) antenna module of the second part through the FRC, a loss of the signal may increase. As a frequency and a length of a transmission line increase, an influence on the signal loss may increase, and, since the FRC or coaxial cable is disposed on an electrical path, an insertion loss may increase. This is because an impedance characteristic of the FRC changes according to a folding operation of the foldable electronic device.

In addition, the FRC and the coaxial cable may be physically broken as the number of folding operations of the foldable electronic device increases.

Aspects of the disclosure are to address at least the above-mentioned problems and/or disadvantages and to provide at least the advantages described below. Accordingly, an aspect of the disclosure is to provide an electronic device including an antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a first part, a second part, a connection part disposed between the first part and the second part and coupled to the first part and the second part such that the first part and the second part are rotatable, a first antenna module disposed in the first part and including an antenna array, a second antenna module disposed in the second part and including an antenna array, at least one processor disposed in the first part, a first intermediate frequency integrated circuit (IFIC) disposed in the first part and electrically connected with the first antenna module and the at least one processor, a second IFIC disposed in the second part and electrically connected with the second antenna module and the at least one processor, and a flexible printed circuit board (FPCB) disposed over the first part, the connection part, and the second part, and configured to deliver a digital signal or an in-phase quadrature (I/Q) signal of a baseband between the at least one processor and the second IFIC.

In accordance with another aspect of the disclosure, an electronic device is provided. The electronic device includes a first part, a second part, a connection part disposed between the first part and the second part and coupled to the first part and the second part such that the first part and the second part are rotatable, a first antenna module disposed in the first part, a second antenna module disposed in the second part, a communication processor disposed in the first part, a first intermediate frequency integrated circuit (IFIC) disposed in the first part and electrically connected with the first antenna module and the communication processor, a second IFIC disposed in the second part and electrically connected with the second antenna module and the first IFIC and an FPCB disposed over the first part, the connection part, and the second part, and configured to deliver a digital signal or an I/Q signal of a baseband between the first IFIC and the second IFIC.

According to an embodiment of the disclosure, the electronic device may reduce a loss of a signal transmitted and received by using a high frequency (for example, mmWave) antenna module.

According to an embodiment of the disclosure, the electronic device may deliver a digital signal or an in-phase quadrature (I/Q) signal of a baseband, so that a loss of a signal transmitted and received by using a high frequency antenna module may be reduced.

According to an embodiment of the disclosure, the electronic device may prevent performance of a high frequency antenna module from being degraded by a folding operation of the electronic device.

According to an embodiment of the disclosure, the electronic device may deliver a signal through a flexible printed circuit board (FPCB), so that an impedance characteristic may be prevented from being changed according to a folding operation of the electronic device, or a transmission characteristic of a signal may be prevented from being degraded.

Other aspects, advantages, and salient features of the disclosure will become apparent to those skilled in the art form the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
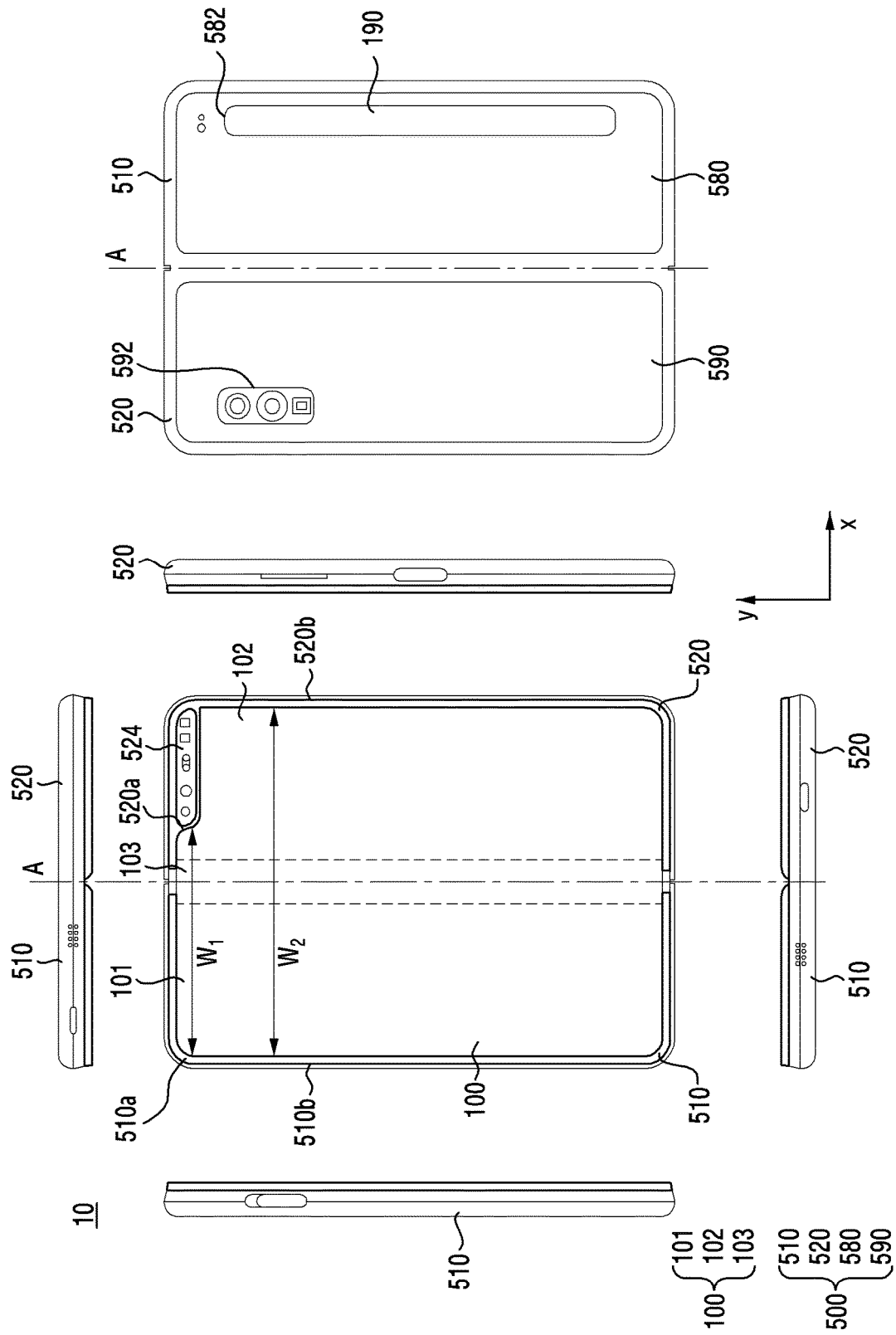
FIG. 1 is a view illustrating an unfolded state of an electronic device according to an embodiment of the disclosure.

FIG. 1 is a view illustrating an unfolded state of an electronic device according to an embodiment of the disclosure.

Figure 2:
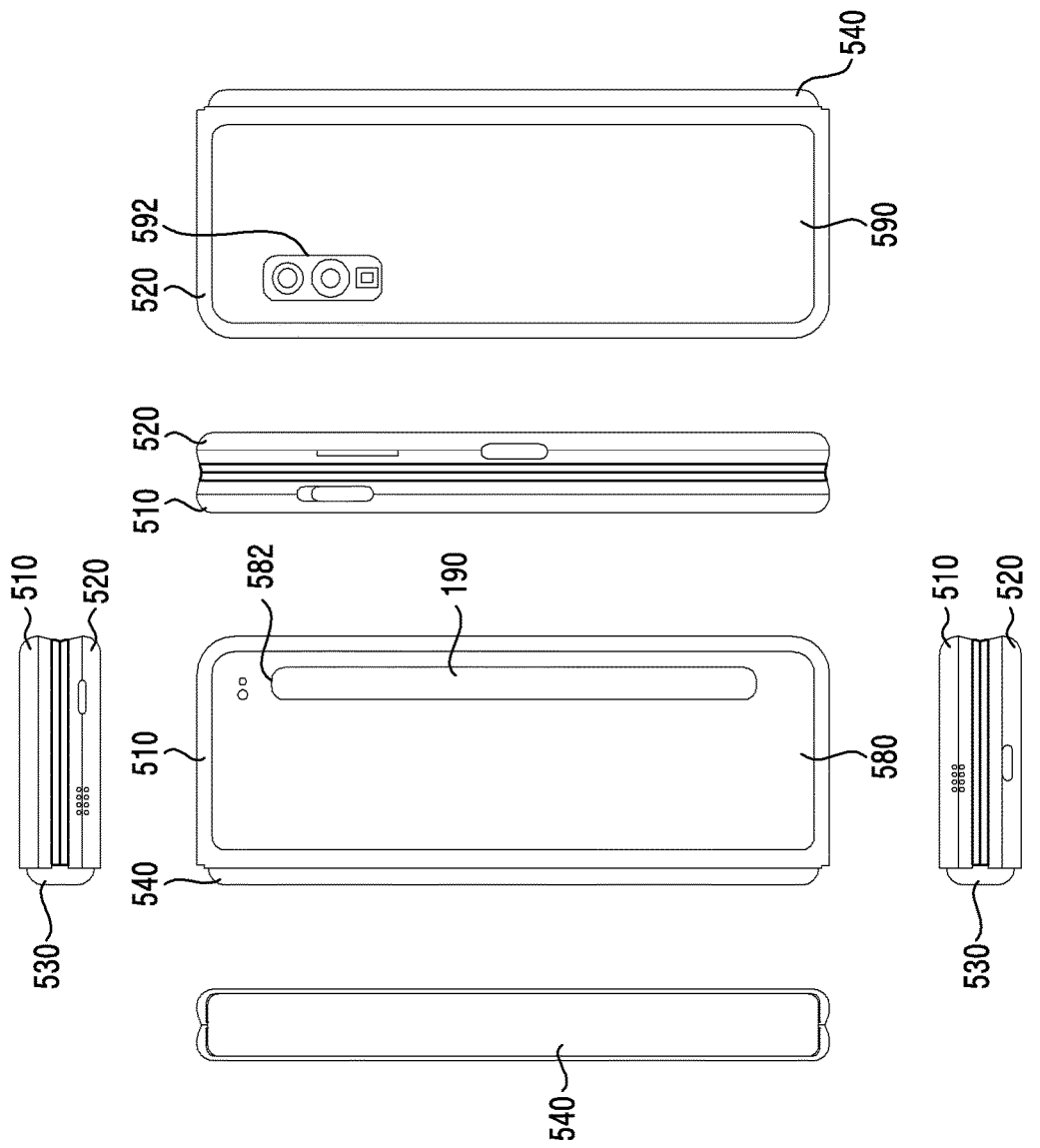
FIG. 2 is a view illustrating a folded state of an electronic device according to an embodiment of the disclosure.

FIG. 2 is a view illustrating a folded state of an electronic device according to an embodiment of the disclosure.

Referring to FIGS. 1 and 2, in an embodiment of the disclosure, the electronic device 10 may include a foldable housing 500, a hinge cover 540 to cover a foldable portion of the foldable housing, and a flexible or foldable display 100 (hereinafter, referred to as a "display" 100) disposed in a space formed by the foldable housing 500. In the disclosure, a surface on which the display 100 is disposed is defined as a first surface or a front surface of the electronic device 10. In addition, the opposite surface of the front surface is defined as a second surface or a rear surface of the electronic device 10. In addition, a surface surrounding a space between the front surface and the rear surface is defined as a third surface or a side surface of the electronic device 10.

In an embodiment of the disclosure, the foldable housing 500 may include a first part 510, a second part 520 including a sensor area 524, a first rear surface cover 580, and a second rear surface cover 590. The foldable housing 500 of the electronic device 10 is not limited to the shape and coupling illustrated in FIGS. 1 and 2, and may be implemented by a combination and/or coupling of other shapes or components. For example, in another embodiment of the disclosure, the first part 510 and the first rear surface cover 580 may be integrally formed with each other, and the second part 520 and the second rear surface cover 590 may be integrally formed with each other.

In the illustrated embodiment of the disclosure, the first part 510 and the second part 520 may be disposed on both sides with reference to a folding axis (A axis), and may have a substantially symmetrical shape with respect to the folding axis A. As will be described below, the first part 510 and the second part 520 may have an angle or a distance therebetween that is changed according to whether the electronic device 10 is in an unfolded state, a folded state, or an intermediate state. In the illustrated embodiment of the disclosure, the second part 520 additionally includes the sensor area 524 where various sensors are disposed, differently from the first part 510, but may have a symmetrical shape on the other area.

Referring to FIG. 1, the first part 510 and the second part 520 may form a recess to accommodate the display 100 altogether. In the illustrated embodiment of the disclosure, the recess may have two or more different widths in a direction perpendicular to the folding axis A due to the sensor area 524.

For example, the recess may have (1) a first width w1 between a first portion 510a of the first part 510 that is parallel to the folding axis A, and a first portion 520a of the second part 520 that is formed on an edge of the sensor area 524, and (2) a second width w2 formed by a second portion 510b of the first part 510 and a second portion 520b of the second part 520 that does not correspond to the sensor area 524 and is parallel to the folding axis A. In this case, the second width w2 may be longer than the first width w1. In other words, the first portion 510a of the first part 510 and the first portion 520a of the second part 520, which have an asymmetrical shape, may form the first width w1 of the recess, and the second portion 510b of the first part 510 and the second portion 520b of the second part 520, which have a symmetrical shape, may form the second width w2 of the recess. In an embodiment of the disclosure, the first portion 520a and the second portion 520b of the second part 520 may have different distances from the folding axis A. The width of the recess is not limited to the illustrated example. In various embodiments of the disclosure, the recess may have a plurality of widths according to a shape of the sensor area 524 or portions of the first part 510 and the second part 520 that have an asymmetrical shape.

In an embodiment of the disclosure, at least part of the first part 510 and the second part 520 may be formed with a metallic material or a nonmetallic material having stiffness of a level selected to support the display 100.

In an embodiment of the disclosure, the sensor area 524 may be formed to have a predetermined area adjacent to one corner of the second part 520. However, the disposal, shape, and size of the sensor area 524 are not limited to the illustrated example. For example, in another embodiment of the disclosure, the sensor area 524 may be provided on another corner of the second part 520 or a certain area between an upper end corner and a lower end corner. In an embodiment of the disclosure, components which are embedded in the electronic device 10 to perform various functions may be exposed to the front surface of the electronic device 10 through the sensor area 524 or one or more openings provided on the sensor area 524. In various embodiments of the disclosure, the components may include various types of sensors. The sensors may include, for example, at least one of a front-facing camera, a receiver, or a proximity sensor.

The first rear surface cover 580 may be disposed on one side of the folding axis on the rear surface of the electronic device, and for example, may have a substantially rectangular periphery and may have the periphery surrounded by the first part 510 Similarly, the second rear surface cover 590 may be disposed on the other side of the folding axis on the rear surface of the electronic device, and may have the periphery surrounded by the second part 520.

In the illustrated embodiment of the disclosure, the first rear surface cover 580 and the second rear surface cover 590 may have a substantially symmetrical shape with reference to the folding axis (A axis). However, the first rear surface cover 580 and the second rear surface cover 590 may not necessarily have the symmetrical shape, and in another embodiment of the disclosure, the electronic device 10 may include the first rear surface cover 580 and the second rear surface cover 590 of various shapes. In still another embodiment of the disclosure, the first rear surface cover 580 may be integrally formed with the first part 510, and the second rear surface cover 590 may be integrally formed with the second part 520.

In an embodiment of the disclosure, the first rear surface cover 580, the second rear surface cover 590, the first part 510, and the second part 520 may form a space to have various components (for example, a printed circuit board or a battery) of the electronic device 10 disposed therein. In an embodiment of the disclosure, one or more components may be disposed on the rear surface of the electronic device 10 or may be visually exposed. For example, at least part of a sub display 190 may be visually exposed through a first rear surface area 582 of the first rear surface cover 580. In another embodiment of the disclosure, one or more components or a sensor may be visually exposed through a second rear surface area 592 of the second rear surface cover 590. In various embodiments of the disclosure, the sensor may include a proximity sensor and/or a rear-facing camera.

Referring to FIG. 2, the hinge cover 540 may be disposed between the first part 510 and the second part 520, and may be configured to hide inner components (for example, a hinge structure). In an embodiment of the disclosure, the hinge cover 540 may be hidden by a portion of the first part 510 and the second part 520, or may be exposed to the outside, according to a state (an unfolded state or a folded state) of the electronic device 10.

For example, when the electronic device 10 is in the unfolded state as shown in FIG. 1, the hinge cover 540 may be hidden by the first part 510 and the second part 520 and may not be exposed. For example, when the electronic device 10 is in the folded state (for example, a fully folded state) as shown in FIG. 2, the hinge cover 540 may be exposed to the outside between the first part 510 and the second part 520. For example, in an intermediate state in which the first part 510 and the second part 520 are folded with a certain angle, the hinge cover 540 may be exposed to the outside in part between the first part 510 and the second part 520. However, in this case, the exposed area may be smaller than in the fully folded state. In an embodiment of the disclosure, the hinge cover 540 may include a curved surface.

The display 100 may be disposed on the space formed by the foldable housing 500. For example, the display 100 may be seated on the recess formed by the foldable housing 500, and may form most of the front surface of the electronic device 10.

Accordingly, the front surface of the electronic device 10 may include the display 100, and some areas of the first part 510 adjacent to the display 100 and some areas of the second part 520. In addition, the rear surface of the electronic device 10 may include the first rear surface cover 580, some areas of the first part 510 that are adjacent to the first rear surface cover 580, the second rear surface cover 590, and some areas of the second part 520 that are adjacent to the second rear surface cover 590.

The display 100 may refer to a display that has at least some areas deformable to a flat surface or a curved surface. In an embodiment of the disclosure, the display 100 may include a folding area 103, a first area 101 disposed on one side (the left of the folding area 103 show in FIG. 1) with reference to the folding area 103, and a second area 102 disposed on the other side (the right of the folding area 103 shown in FIG. 1).

The divided areas of the display 100 shown in FIG. 1 are examples and the display 100 may be divided into a plurality of areas (for example, four or more areas or two areas) according to a structure or a function of the display 100. For example, in the embodiment illustrated in FIG. 1, the display 100 may be divided into areas by the folding area 103 extended in parallel with the y-axis or the folding axis (A axis), but in another embodiment of the disclosure, the display 100 may be divided into areas with reference to another folding area (for example, a folding area parallel to the x-axis) or another folding axis (for example, a folding axis parallel to the x-axis).

The first area 101 and the second area 102 may have a substantially symmetrical shape with reference to the folding area 103. However, the second area 102 may include a notch that is cut according to the presence of the sensor area 524, differently from the first area 101, but may have a symmetrical shape with the first area 101 on the other area. In other words, the first area 101 and the second area 102 may include portions that have a symmetrical shape and portions that have an asymmetrical shape.

Hereinafter, operations of the first part 510 and the second part 520 and respective areas of the display 100 according to a state (for example, an unfolded state or a folded state) of the electronic device 10 will be described.

In an embodiment of the disclosure, when the electronic device 10 is in the unfolded state (for example, FIG. 1), the first part 510 and the second part 520 may form the angle of 180° and may be disposed to face in the same direction. A surface of the first area 101 of the display 100 and a surface of the second area 102 may form the angle of 180° with each other, and may face in the same direction (for example, the front surface direction of the electronic device). The folding area 103 may form the same plane as the first area 101 and the second area 102.

In an embodiment of the disclosure, when the electronic device 10 is in the folded state (for example, FIG. 2), the first part 510 and the second part 520 may be disposed to face each other. The surface of the first area 101 of the display 100 and the surface of the second area 102 may face each other while forming a small angle (for example, between 0° and 10°) with each other. At least part of the folding area 103 may have a curved surface having a predetermined curvature.

In an embodiment of the disclosure, when the electronic device 10 is in the intermediate state (for example, FIG. 2), the first part 510 and the second part 520 may be disposed with a certain angle. The surface of the first area 101 of the display 100 and the surface of the second area 102 may form an angle that is larger than in the folded state and is smaller than in the unfolded state. At least part of the folding area 103 may have a curved surface having a predetermined curvature, and the curvature in this state may be smaller than in the folded state.

Figure 3:
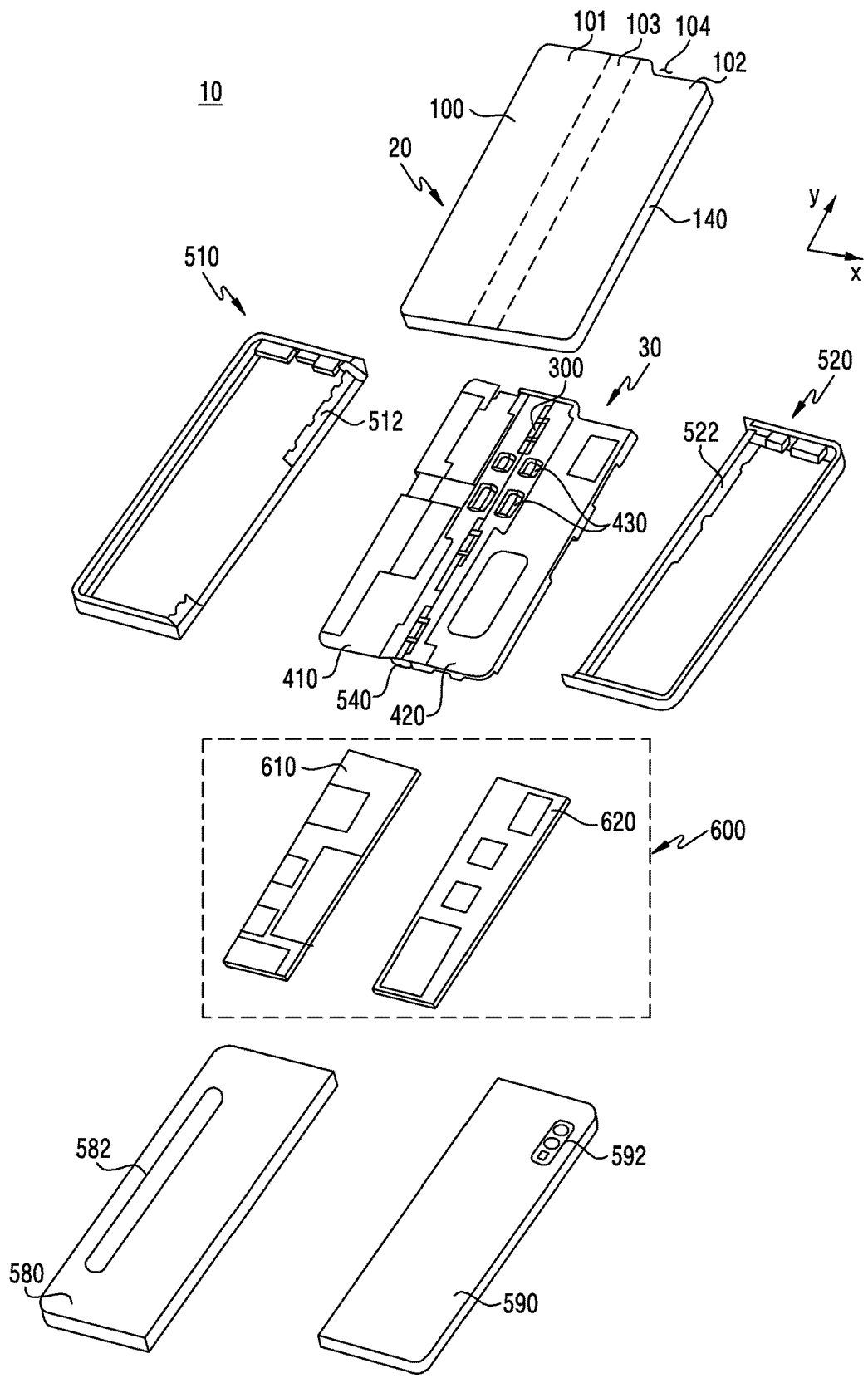
FIG. 3 is an exploded perspective view of an electronic device according to an embodiment of the disclosure.

FIG. 3 is an exploded perspective view of an electronic device according to an embodiment of the disclosure.

Referring to FIG. 3, in an embodiment of the disclosure, the electronic device 10 may include a display unit 20, a bracket assembly 30, a board unit 600, a first part 510, a second part 520, a first rear surface cover 580, and a second rear surface cover 590. In the disclosure, the display unit 20 may be referred to as a display module or a display assembly.

The display unit 20 may include a display 100 and one or more plates 140 (or one or more layers 140) on which the display 100 is seated. In an embodiment of the disclosure, the plate 140 may be disposed between the display 100 and the bracket assembly 30. The display 100 may be disposed on at least part of one surface (for example, an upper surface in FIG. 3) of the plate 140. The plate 140 may be formed in a shape corresponding to the display 100. For example, some areas of the plate 140 may be formed in a shape corresponding to a notch 104 of the display 100.

The bracket assembly 30 may include a first bracket 410, a second bracket 420, a hinge structure disposed between the first bracket 410 and the second bracket 420, a hinge cover 540 to cover the hinge structure when it is viewed from the outside, and a wire member 430 (for example, a flexible printed circuit board (FPCB)) crossing over the first bracket 410 and the second bracket 420.

In an embodiment of the disclosure, the bracket assembly 30 may be disposed between the plate 140 and the board unit 600. For example, the first bracket 410 may be disposed between a first area 101 of the display 100 and a first board 610. The second bracket 420 may be disposed between a second area 102 of the display 100 and a second board 620.

In an embodiment of the disclosure, at least part of the wire member 430 may be disposed inside the bracket assembly 30. The wire member 430 may be disposed in a direction (for example, an x-axis direction) of crossing over the first bracket 410 and the second bracket 420. The wire member 430 may be disposed in a direction (for example, the x-axis direction) perpendicular to a folding axis (for example, the y-axis or the folding axis A of FIG. 1) of the folding area 103 of the electronic device 10.

As mentioned above, the board unit 600 may include the first board 610 disposed on the first bracket 410 side, and the second board 620 disposed on the second bracket 420 side. The first board 610 and the second board 620 may be disposed in a space formed by the bracket assembly 30, the first part 510, the second part 520, the first rear surface cover 580, and the second rear surface cover 590. Components for implementing various functions of the electronic device 10 may be mounted on the first board 610 and the second board 620. For example, an application processor (for example, a processor 920 of FIG. 9), a communication processor (for example, a communication module 990 of FIG. 9), a first power management integrated circuit (PMIC) (for example, a power management module 988 of FIG. 9), a random access memory (RAM) (for example, a volatile memory 932 of FIG. 9), and a flash memory (for example, a nonvolatile memory 934 of FIG. 9) may be disposed on the first board 610, and a second PMIC (for example, the power management module 988 of FIG. 9) and a Wi-Fi module (for example, a wireless communication module 992 of FIG. 9) may be disposed on the second board 620. However, the components disposed on the first board 610 and the second board 620 are not limited to the above-described examples.

The first part 510 and the second part 520 may be assembled with each other to be coupled to both sides of the bracket assembly 30 with the display unit 20 being coupled to the bracket assembly 30. As will be described below, the first part 510 and the second part 520 may slide from both sides of the bracket assembly 30 and may be coupled with the bracket assembly 30. In an embodiment of the disclosure, at least part of a hinge structure 300 may be disposed in the bracket assembly 30. The bracket assembly 30 or the hinge structure 300 may be referred to as a 'connector' in that it is coupled to the first part 510 and the second part 520 to make the first part 510 and the second part 520 rotatable.

In an embodiment of the disclosure, the first part 510 may include a first rotation support surface 512, and the second part 520 may include a second rotation support surface 522 corresponding to the first rotation support surface 512. The first rotation support surface 512 and the second rotation support surface 522 may include curved surfaces corresponding to curved surfaces included in the hinge cover 540.

In an embodiment of the disclosure, when the electronic device 10 is in the unfolded state (for example, the electronic device of FIG. 1), the first rotation support surface 512 and the second rotation support surface 522 may cover the hinge cover 540, such that the hinge cover 540 is not exposed to the rear surface of the electronic device 10 or is exposed to the minimum. On the other hand, when the electronic device 10 is in the folded state (for example, the electronic device of FIG. 2), the first rotation support surface 512 and the second rotation support surface 522 may rotate along the curved surface included in the hinge cover 540, such that the hinge cover 540 is exposed to the rear surface of the electronic device 10 to the maximum.

Figure 4:
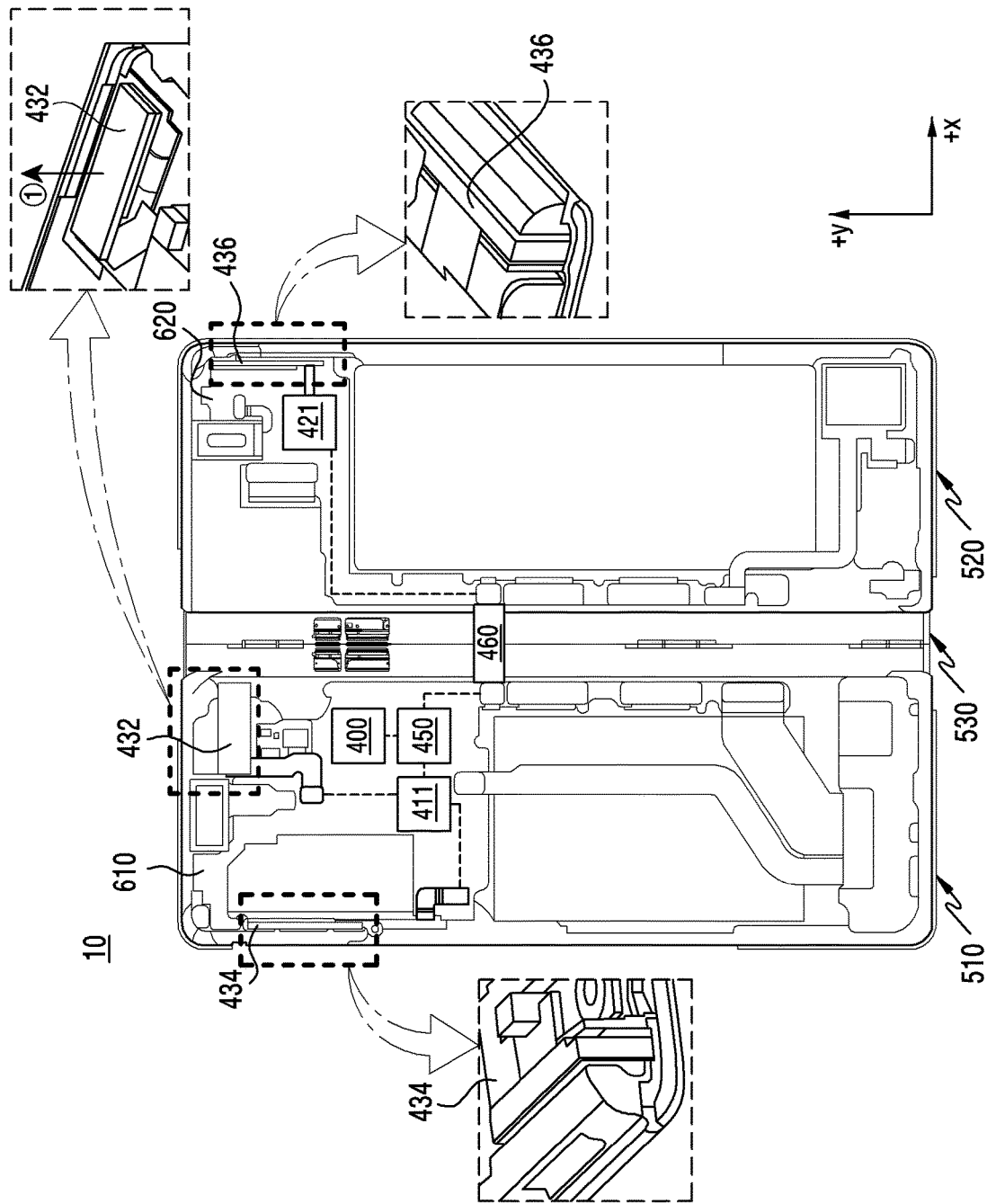
FIG. 4 is a view illustrating an interior of an electronic device according to an embodiment of the disclosure.

FIG. 4 illustrates an interior of an electronic device according to an embodiment of the disclosure.

Referring to FIG. 4, the electronic device 10 according to an embodiment may include a first antenna module 432, a second antenna module 434, a third antenna module 436, a communication processor 400, a first intermediate frequency integrated circuit (IFIC) 411, a second IFIC 421, a connection member 460, a first switch 450, and a connection part 530.

In an embodiment of the disclosure, the first antenna module 432 and the second antenna module 434 may be disposed in the first part 510. For example, the first antenna module 432 may be disposed adjacent to a first periphery of peripheries of the first part 510 that faces in the +y direction, and the second antenna module 434 may be disposed adjacent to a second periphery of the peripheries of the first part 510 that faces in the −x direction. The first periphery and the second periphery may be substantially perpendicular to each other.

In an embodiment of the disclosure, positions where the first antenna module 432 and the second antenna module 434 are disposed, respectively, are not limited by the illustrated example, and the first antenna module 432 and the second antenna module 434 may be disposed adjacent to one periphery of the peripheries of the first part 510, or may be disposed adjacent to two different peripheries, respectively.

In an embodiment of the disclosure, the first antenna module 432 may be disposed to face a front surface or a rear surface (for example, the direction of ① ) of the electronic device 10. For example, the first antenna module 432 may be disposed such that a surface having a wide width faces the front surface or rear surface of the electronic device 10. In another example, the first antenna module 432 may include an array antenna and the first antenna module 432 may be disposed such that a surface where the array antenna is formed faces the front surface or rear surface of the electronic device 10. The first antenna module 432 may form a beam pattern toward the front surface or rear surface of the electronic device 10 by using the array antenna, and may emit an RF signal to a free space. The array antenna of the first antenna module 432 may include a patch antenna and/or a dipole antenna.

In an embodiment of the disclosure, the second antenna module 434 may be disposed to face a side surface of the electronic device 10 (for example, the −x direction when the second antenna module 434 is adjacent to the second periphery). For example, the second antenna module 434 may be disposed such that a surface having a wide width faces the side surface of the electronic device 10. In another example, the second antenna module 434 may be disposed such that a surface where the array antenna of the second antenna module 434 is formed faces the side surface of the electronic device 10.

In an embodiment of the disclosure, directions in which the first antenna module 432 and the second antenna module 434 face, respectively, are not limited to the illustrated example, and the first antenna module 432 and the second antenna module 434 may be disposed to face any one of the front surface, the rear surface, and the side surface of the electronic device 10, or may be disposed to face two of the front surface, the rear surface, and the side surface of the electronic device 10.

In an embodiment of the disclosure, the first antenna module 432 and the second antenna module 434 may be electrically connected to the first board 610 disposed in the first part 510 through a connection member, and may be electrically connected with the first IFIC 411, the first switch 450, and the communication processor 400 through an electrical path provided by the first board 610. The connection member may include a coaxial cable connector, a board-to-board connector, an interposer, or an FPCB.

In an embodiment of the disclosure, the third antenna module 436 may be disposed in the second part 520. For example, the third antenna module 436 may be disposed adjacent to a third periphery of peripheries of the second part 520 that faces in the +x direction.

In an embodiment of the disclosure, a position where the third antenna module 436 is disposed is not limited by the illustrated example, and the third antenna module 436 may be disposed adjacent to one periphery of the peripheries of the second part 520.

In an embodiment of the disclosure, the third antenna module 436 may be disposed to face a side surface of the electronic device 10 (for example, the +x direction when the third antenna module 436 is adjacent to the third periphery). For example, the third antenna module 434 may be disposed such that a surface having a wide width faces the side surface of the electronic device 10. In another example, the third antenna module 436 may be disposed such that a surface where an array antenna of the third antenna module 436 is formed faces the side surface of the electronic device 10.

In an embodiment of the disclosure, the direction in which the third antenna module 436 faces is not limited to the illustrated example, and the third antenna module 436 may be disposed to face any one of the front surface, the rear surface, and the side surface of the electronic device 10.

In an embodiment of the disclosure, the third antenna module 436 may be electrically connected to the second board 620 disposed in the second part 520 through a connection member (for example, a connector 650 of FIG. 6A), and may be electrically connected with the second IFIC 421 through an electrical path provided by the second board 620. The third antenna module 436 may be electrically connected with the first switch 450 and the communication processor 400 of the first board 610 through the connection member 460. The connection member 460 may be a configuration that is distinguished from a wire member (for example, the wire member 430 of FIG. 3) penetrating through the connection part 530.

The electronic device 10 according to an embodiment may include a third board (not shown) disposed in the second part 520. For example, a camera module (for example, a camera module 980 of FIG. 9), a sensor module (for example, a sensor module 976 of FIG. 9) or a connection terminal (for example, a connection terminal 978 of FIG. 9) may be disposed on the third board, but this should not be considered as limiting. The third board (not shown) disposed in the second part 520 may include another connection member (not shown) (for example, an FPCB). For example, the camera module (for example, the camera module 980 of FIG. 9), the sensor module (for example, the sensor module 976 of FIG. 9), and/or the connection terminal (for example, the connection terminal 978 of FIG. 9) may be electrically connected with a processor (for example, the processor 920 of FIG. 9) of the first board 610 through another connection member (not shown). In another embodiment of the disclosure, the third board (not shown) and the second board 620 may be integrally formed with each other. For example, the camera module (for example, the camera module 980 of FIG. 9), the sensor module (for example, the sensor module 976 of FIG. 9), or the connection terminal (for example, the connection terminal 978 of FIG. 9) may be disposed on the second board 620.

In an embodiment of the disclosure, the communication processor 400 may be disposed on the first board 610. In an embodiment of the disclosure, the communication processor 400 may be operatively connected with the first antenna module 432 and the second antenna module 434. For example, the communication processor 400 may be electrically connected with the first switch 450 disposed on the first board 610, and the first switch 450 may be electrically connected with the first IFIC 411 disposed on the first board 610. The first IFIC 411 may be electrically connected with the first antenna module 432 and the second antenna module 434. In an embodiment of the disclosure, the communication processor 400 may be operatively connected with the third antenna module 434. For example, the communication processor 400 may be electrically connected with the first switch 450, and the first switch 450 may be electrically connected with the second IFIC 421 disposed on the second board 620 through the connection member 460. The second IFIC 421 may be electrically connected with the third antenna module 436.

In an embodiment of the disclosure, the first switch 450 may be electrically connected with the communication processor and the first IFIC 411. In another embodiment of the disclosure, the first switch 450 may be included in the first IFIC 411. When the first switch 450 is included in the first IFIC 411, the first IFIC 411 may perform a function of the first switch 450. The first switch 450 may include a switching circuit. The first switch 450 may be controlled by the communication processor 400.

In an embodiment of the disclosure, the connection member 460 may be extended from the first board 610 to the second board 6201 by passing through the connection part 530. The connection member 460 may be connected to the first board 610 and the second board 620. For example, the connection member 460 may include a first connector 461 and a second connector 462, and the first connector 461 (for example, a plug) may be connected to a coupling part (for example, a socket) provided on the first board 610, and the second connector 462 may be connected to a coupling part provided on the second board 620. The connection member 460 may be bent in response to a folding operation of the electronic device 10. The connection member 460 may include a plurality of transmission lines. For example, the connection member 460 may include a plurality of signal lines and/or power lines. In an embodiment of the disclosure, the connection member 460 may include a flexible printed circuit board (FPCB), but this should not be considered as limiting.

In an embodiment of the disclosure, the connection part 530 may be disposed between the first part 510 and the second part 520 to activate a folding operation of the electronic device 10. The connection part 530 may include at least one of the bracket assembly 30, the hinge structure 300, and/or the hinge cover 540 which is coupled with the first part 510 and the second part 520. For example, the connection part 530 may be defined by the bracket assembly 30, the hinge structure 300, or the hinge cover 540. In another example, the connection part 530 may be defined by the hinge structure 300 and the hinge cover 540. In another example, the connection part 530 may be defined by a part of the bracket assembly 30.

In an embodiment of the disclosure, the third antenna module 436 disposed in the second part 520 may be positioned further away from the communication processor 400 than the first antenna module 432 and the second antenna module 434 which are disposed in the first part 510. In an embodiment of the disclosure, the third antenna module 436 may be positioned further away from the first IFIC 411 than the first antenna module 432 and the second antenna module 434. In an embodiment of the disclosure, a length of a transmission line connecting the communication processor 400 and the third antenna module 436 may be longer than those for the first antenna module 432 and the second antenna module 434. As the third antenna module 436 is further away from the communication processor 400 and the transmission line to the third antenna module 436 increases, a loss of a signal transmitted to the third antenna module 436 may increase more. As a frequency band increases, the loss of the signal passing through the transmission line may increase more. Since a signal transmitted to the third antenna module 436 of the second part 520 is transmitted from the communication processor 400 of the first part 510 and passes through the connection part 530, an insertion loss of the signal may increase more than that of the first antenna module 432 and the second antenna module 434. In addition, an impedance characteristic of the signal transmitted to the third antenna module 436 may be changed according to a folding operation of the electronic device 10, and performance of the third antenna module 436 may be degraded.

Figure 5A:
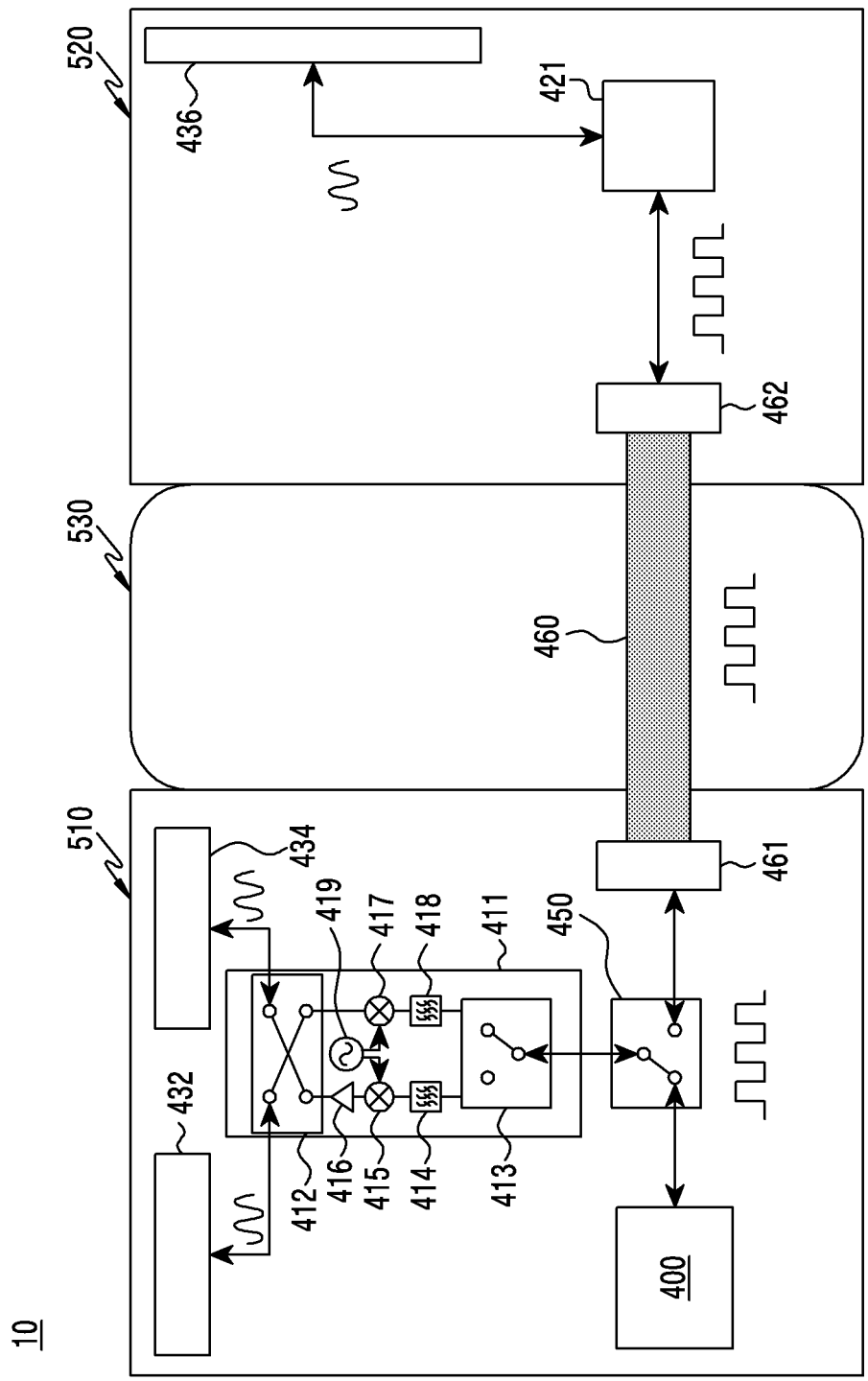
FIG. 5A is a concept view illustrating operations of an electronic device according to an embodiment of the disclosure.

FIG. 5A is a concept view illustrating operations of an electronic device according to an embodiment of the disclosure.

Figure 5B:
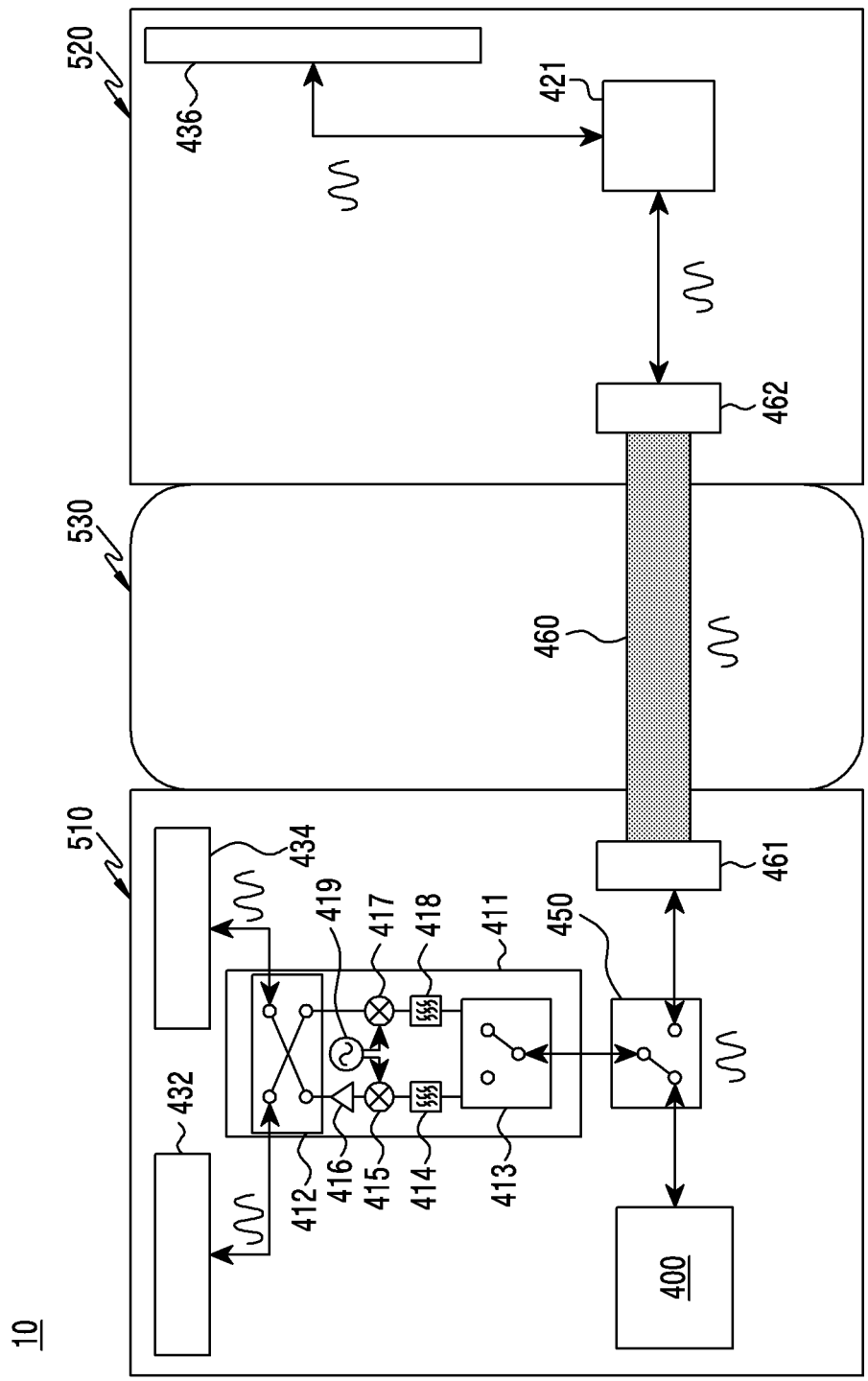
FIG. 5B is a concept view illustrating operations of an electronic device according to an embodiment of the disclosure.

FIG. 5B is a concept view illustrating operations of an electronic device according to an embodiment of the disclosure.

Figure 5C:
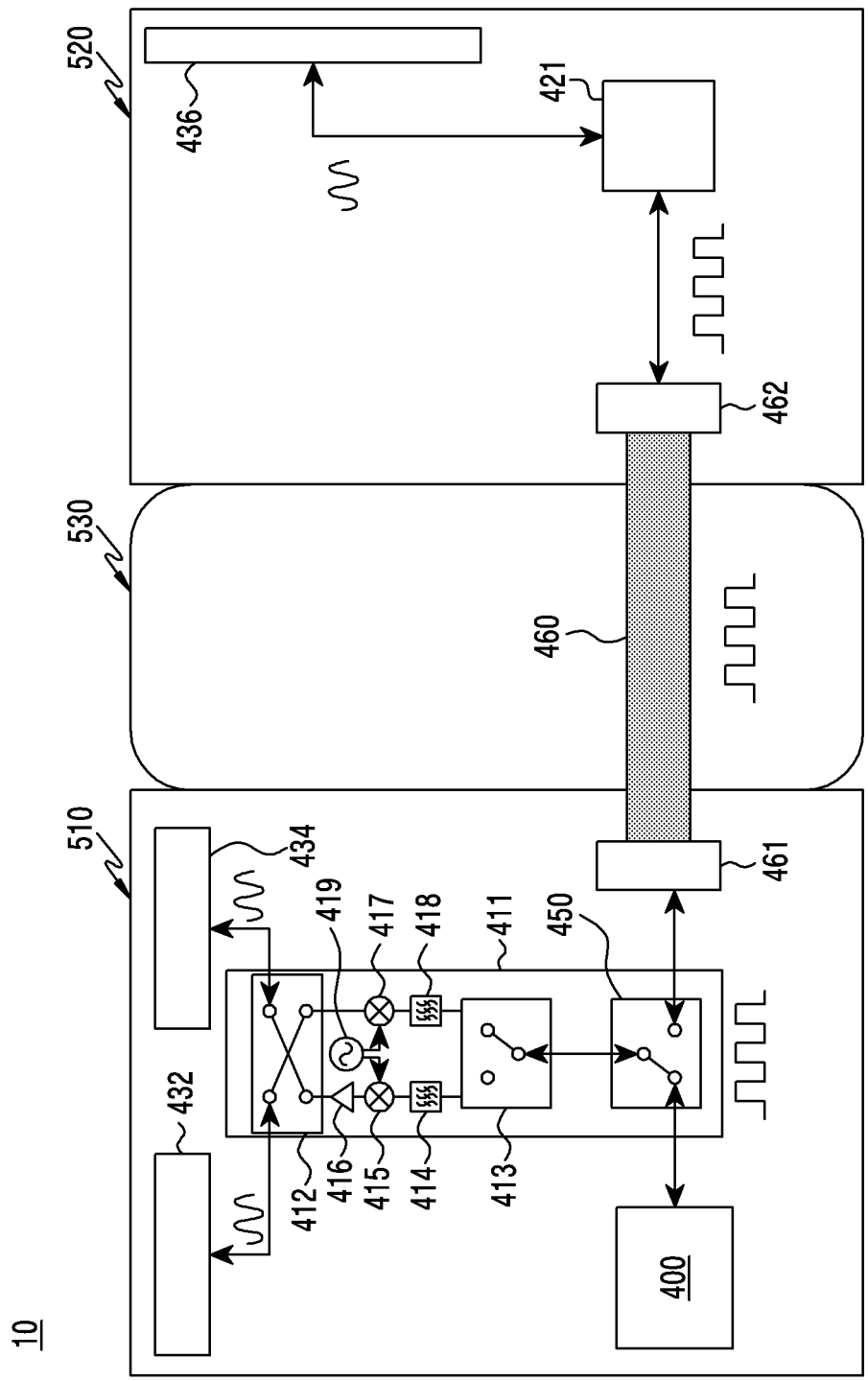
FIG. 5C is a concept view illustrating operations of an electronic device according to an embodiment of the disclosure.

FIG. 5C is a concept view illustrating operations of an electronic device according to an embodiment of the disclosure.

Referring to FIGS. 5A, 5B, and 5C, the communication processor 400 according to an embodiment may transmit or receive a radio frequency (RF) signal by using the first antenna module 432, the second antenna module 434, and/or the third antenna module 436.

In an embodiment of the disclosure, the first antenna module 432 and/or the second antenna module 434 may be electrically connected with the first IFIC 411. For example, the first antenna module 432 and the second antenna module 434 may be connected to a second switch 412 included in the first IFIC 411. The communication processor 400 according to an embodiment may allow the second switch 412 to be connected with the first antenna module 432 when the communication processor 400 transmits or receives an RF signal by using the first antenna module 432, and may allow the second switch 412 to be connected with the second antenna module 434 when the communication processor 400 transmits or receives an RF signal by using the second antenna module 434.

In an embodiment of the disclosure, the first IFIC 411 may include a transmission path and a reception path, and may include a third switch 413 to selectively connect the transmission path and the reception path. According to an embodiment of the disclosure, when the communication processor 400 transmits an RF signal, the communication processor 400 may allow the third switch 413 to be connected to the transmission path, and, when the communication processor 400 receives an RF signal, the communication processor 400 may allow the third switch 413 to be connected to the reception path.

In an embodiment of the disclosure, a low pass filter (LPF) 414, a mixer 415, and an IF amplifier 416 may be disposed on the transmission path of the first IFIC 411. The LPF 414 may be a channel filter which filters a bandwidth of a baseband as a blocking frequency. The blocking frequency may be variably implemented. The mixer 415 may convert an I/Q signal of a baseband into an IF signal. For example, the mixer 415 may generate an IF signal having a frequency (for example, 9 GHz-11 GHz) higher than a baseband signal and a local oscillator (LO) signal, by mixing a local oscillator (LO) signal provided from a local oscillator 419, and an I/Q signal of a baseband passing through the LPF 414. The IF amplifier 416 may amplify the IF signal. The IF amplifier 416 may include, for example, a variable gain amplifier (VGA), and may perform auto gain control (AGC) under control of the communication processor 400.

In an embodiment of the disclosure, the first IFIC 411 may process a signal provided from the communication processor 400 when transmitting signals. For example, referring to FIG. 5A, the first IFIC 411 may modulate a digital signal provided from the communication processor 400. For example, the first IFIC 411 may generate an I/Q signal of a baseband by performing in phase quadrature modulation (I/Q modulation) with respect to a digital signal provided from the communication processor 400. In another example, referring to FIG. 5B, a digital signal may be modulated by the communication processor 400, which is different from FIG. 5A. When the communication processor 400 modulates the digital signal, the first IFIC 411 may up-convert an I/Q signal of a baseband provided from the communication processor 400 into an IF signal, and may provide the IF signal to the first antenna module 432 or the second antenna module 434. The communication processor 400 or the first IFIC 411 may include a modulator (for example, a digital-to-analogue converter (DAC)) to modulate a digital signal and to generate an I/Q signal of a baseband.

In an embodiment of the disclosure, a mixer 417 and an LPF 418 may be included in the reception path of the first IFIC 411. The functions of the mixer 417 and the LPF 418 may be the same as or similar to the functions of the mixer 415 and the LPF 414 of the transmission path. The mixer 417 may convert an RF signal transmitted from the first antenna module 432 or the second antenna module 434 into an I/Q signal of a baseband. The LPF 414 may be a channel filter which filters a bandwidth of a baseband as a blocking frequency.

In an embodiment of the disclosure, when receiving signals, the first IFIC 411 may process an I/Q signal of a baseband which is generated as a result of down-converting an IF signal. For example, referring to FIG. 5A, the first IFIC 411 may generate a digital signal by demodulating an I/Q signal of a baseband, and may provide the generated digital signal to the communication processor 400. In another example, referring to FIG. 5B, the first IFIC 411 may provide an I/Q signal of a baseband to the communication processor 400, and the communication processor 400 may demodulate the I/Q signal of the baseband into a digital signal, which is different from FIG. 5A. The communication processor 400 or the first IFIC 411 may include a demodulator (for example, an analog to digital converter) to demodulate an I/Q signal of a baseband and to generate a digital signal.

In an embodiment of the disclosure, various design changes may be made to the configuration of the first IFIC 411. For example, the first IFIC 411 may include a plurality of transmission paths and a plurality of reception paths. In another example, the first IFIC 411 may include a phase locked loop (PLL) to stabilize or move a frequency of an LO signal outputted from the local oscillator 419. In another example, the first IFIC 411 may include a buffer to stably deliver an I/Q signal of a baseband to the communication processor 400 or to stably process an I/Q signal of a baseband delivered. In another example, a plurality of VGAs may be included in the transmission or reception paths, respectively.

In an embodiment of the disclosure, the first switch 450 may be selectively connected with the first IFIC 411 or the second IFIC 421. According to an embodiment of the disclosure, when the communication processor 400 transmits or receives an RF signal by using the first antenna module 432 or the second antenna module 434, the communication processor 400 may allow the first switch 450 to be electrically connected with the first IFIC 411. According to an embodiment of the disclosure, when the communication processor 400 transmits or receives an RF signal by using the third antenna module 436, the communication processor 400 may allow the first switch 450 to be electrically connected with the second IFIC 421. In another embodiment of the disclosure, referring to FIG. 5C, the first switch 450 may be included in the first IFIC 411. When the first switch 450 is included in the first IFIC 411, the first IFIC 411 may perform the function of the first switch 450.

In an embodiment of the disclosure, the connection member 460 may be disposed on a signal transmission path between the first IFIC 411 and the second IFIC 421.

In an embodiment of the disclosure, the first switch 450 may be included in the communication processor 400. When the first switch 450 is included in the communication processor 400, the communication processor 400 may perform the function of the first switch 450.

In an embodiment of the disclosure, the third antenna module 436 may be electrically connected with the second IFIC 421. The third antenna module 436 may transmit an RF signal provided from the second IFIC 421, or may provide a received RF signal to the second IFIC 421.

In an embodiment of the disclosure, the configuration of the second IFIC 421 may be the same as or similar to the configuration of the first IFIC 411. For example, the second IFIC 421 may include a transmission path and a reception path, and may include a switch corresponding to the third switch 413 to select the transmission path and the reception path. An LPF, a mixer, and an IF amplifier may be disposed on the transmission path of the second IFIC 421, and a mixer and an LPF may be disposed on the reception path. In another example, the second IFIC 421 may not include a configuration corresponding to the second switch 412 of the first IFIC 411.

In an embodiment of the disclosure, when transmitting signals, the communication processor 400 may generate a signal based on data, and may provide the generated signal to the first IFIC 411 or the second IFIC 421. For example, referring to FIG. 5A, the communication processor 400 may acquire a digital signal by encoding data, and may provide the generated digital signal to the first IFIC 411 or the second IFIC 421. The first IFIC 411 and the second IFIC 421 may generate an I/Q signal of a baseband by modulating the digital signal provided from the communication processor 400. In another example, referring to FIG. 5B, the communication processor 400 may generate an I/Q signal of a baseband by modulating the acquired digital signal, and may provide the I/Q signal of the baseband generated to the first IFIC 411 or the second IFIC 421.

In an embodiment of the disclosure, when receiving signals, the communication processor 400 may acquire data based on a signal provided from the first IFIC 411 or the second IFIC 421. For example, referring to FIG. 5A, the communication processor 400 may acquire data by decoding a digital signal provided from the first IFIC 411 or the second IFIC 412. In another example, referring to FIG. 5B, the communication processor 400 may acquire data by demodulating and decoding an I/Q signal of a baseband provided from the first IFIC 411 or the second IFIC 421.

In an embodiment of the disclosure, the connection member 460 may be disposed on a signal transmission path between the communication processor 400 and the second IFIC 421. In an embodiment of the disclosure, the connection member 460 may not include a coaxial cable and a flexible RF cable (FRC). In the case of the connection member like the coaxial cable and the FRC, an impedance characteristic may be more greatly changed (more susceptible to) according to a folding operation of the electronic device 10 than in the case of an FPCB. The connection member like the coaxial cable and the FRC may be physically broken more easily according to the folding operation of the electronic device 10 than the FPCB. When the connection member like the coaxial cable and the FRC is used, wireless communication performance of the electronic device 10 may be degraded. In an embodiment of the disclosure, the connection member including an FPCB may prevent or reduce an impedance change caused by a folding operation of the electronic device 10. In an embodiment of the disclosure, the connection member 460 including the FPCB may have higher durability against a folding operation of the electronic device 10 than the flexible RF cable (FRC) and the coaxial cable. In an embodiment of the disclosure, the connection member 460 including the FPCB may prevent or reduce degradation of wireless communication performance caused by a folding operation of the electronic device 10.

In an embodiment of the disclosure, when a digital signal is transmitted through the connection member 460 including the FPCB between the communication processor 400 and the second IFIC 421, an influence by a noise depending on a transmission distance may be reduced. For example, when a digital quadrature (IQ) signal is transmitted, the digital IQ signal may be transmitted to the second IFIC 421 through the connection member 460 including the FPCB without a loss of data.

In an embodiment of the disclosure, the third antenna module 436 may be disposed further away from the communication processor 400 than the first antenna module 432 and the second antenna module 434. In an embodiment of the disclosure, the third antenna module 436 may be closer to the second IFIC 421 than the first IFIC 411.

In an embodiment of the disclosure, the communication processor 400 may transmit a digital signal or an I/Q signal of a baseband to the second IFIC 421 which is positioned at a long distance, and the second IFIC 421 may process the signal received from the communication processor 400 and may provide the signal to the third antenna module 436, so that a signal loss occurring in the process of delivering a signal to the third antenna module 436 may be reduced.

In an embodiment of the disclosure, the communication processor 400 may receive a digital signal or an I/Q signal of a baseband from the second IFIC 421 which is positioned at a long distance, so that a signa loss occurring in the process of delivering a signal from the third antenna module 436 to the communication processor 400 may be reduced.

In an embodiment of the disclosure, the second IFIC 421 may be integrally formed with the third antenna module 436. For example, the third antenna module 436 may include the second IFIC 421. In this case, the third antenna module 436 may perform the function of the second IFIC 421. For example, the third antenna module 436 may process a signal received from the communication processor 400, and may provide the signal to an outside (for example, the air), or may process a signal received from an outside and may provide the signal to the communication processor 400.

Figure 6A:
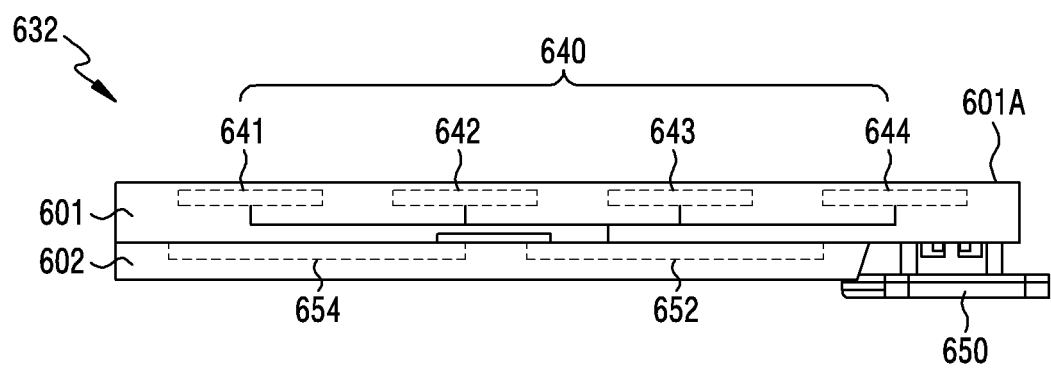
FIG. 6A is a view illustrating a high frequency antenna module according to an embodiment of the disclosure.

FIG. 6A illustrates a high frequency antenna module according to an embodiment of the disclosure.

Figure 6B:
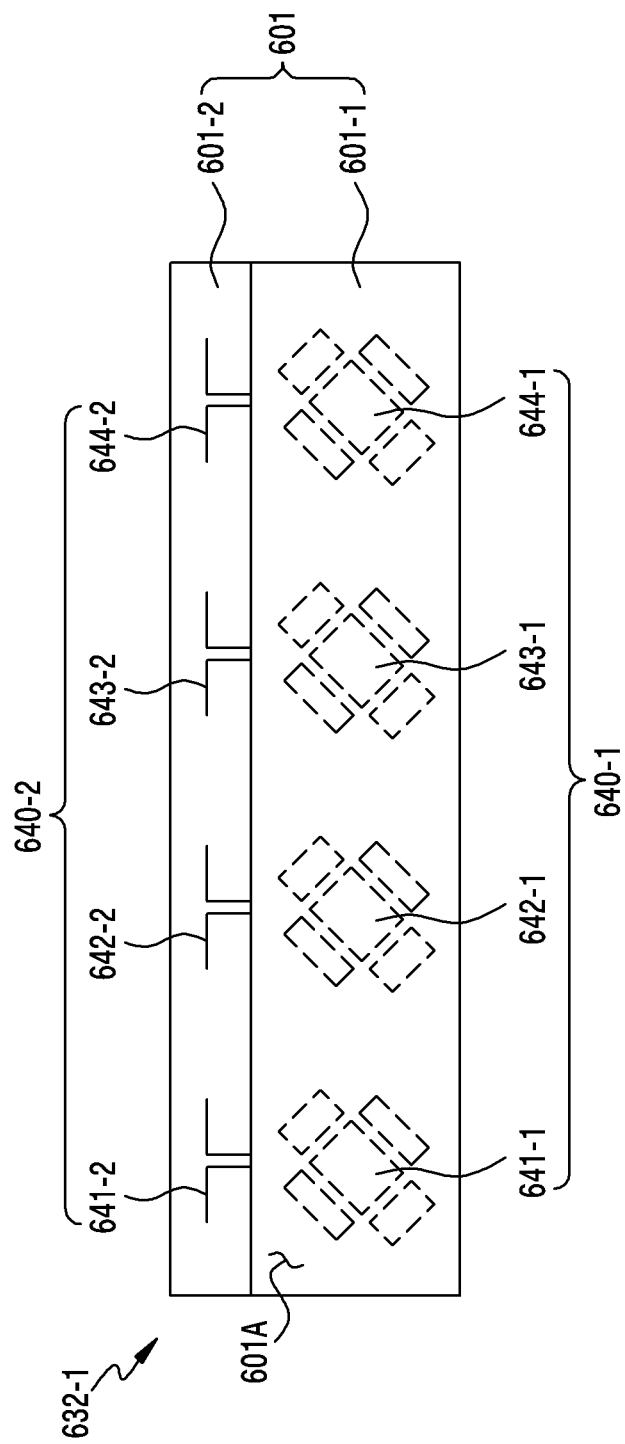
FIG. 6B is a view illustrating a high frequency antenna module according to an embodiment of the disclosure.

FIG. 6B illustrates a high frequency antenna module according to an embodiment of the disclosure.

Referring to FIG. 6A, a high frequency antenna module 632 may correspond to the first antenna module 432, the second antenna module 434, and the third antenna module 436 of FIGS. 4, and 5A to 5C, respectively.

The high frequency antenna module 632 according to an embodiment may include a board 601, an antenna array 640, a radio frequency integrated circuit (RFIC) 652, a power manage integrated circuit (PMIC) 654, a connector 650 and a shielding member 602. In another embodiment of the disclosure, at least one of the above-mentioned components may be omitted, or at least two of the above-mentioned components may be integrally formed.

In an embodiment of the disclosure, the board 601 may include a plurality of conductive layers and a plurality of nonconductive layers which are stacked, alternating with the conductive layers. The board 601 may provide electrical connection between various components disposed inside and/or outside the board 601 by using wires and conductive vias formed in the conductive layers.

In an embodiment of the disclosure, the antenna array 640 may include a plurality of antenna elements 641, 642, 643, or 644 which are disposed to form a directional beam. The antenna elements may be formed inside the board 601 as shown in the drawing, or may be formed on a first surface 601A of the board 601, which is different from the illustration. According to an embodiment of the disclosure, the antenna array 640 may include a plurality of antenna arrays of the same or different shapes or types.

Referring to FIG. 6B, the high frequency antenna module 632-1 (for example, the high frequency antenna module 632 of FIG. 6A) according to an embodiment may include a patch antenna array 640-1 and/or a dipole antenna array 640-2. The patch antenna array 640-1 may include a plurality of patch antenna elements 641-1, 642-1, 643-1, 644-1. The dipole antenna array 640-2 may include a plurality of dipole antenna elements 641-2, 642-2, 643-2, 644-2. The patch antenna array 640-1 may be disposed in a first area 601-1 when the board 601 is viewed above the first surface 601A. The patch antenna array 640-1 may be disposed on the first surface 601A in the first area 601-1, or may be disposed inside the board 601 in the first area 601-1. The dipole antenna array 640-2 may be disposed in a second area 601-2 when the board 601 is viewed above the first surface 601A. The dipole antenna array 640-2 may be disposed on the first surface 601A in the second area 601-2, or may be disposed inside the board 601 in the second area 601-2. The patch antenna array 640-1 and the dipole antenna array 640-2 may be disposed on the same layer among the plurality of layers of the board 601, or may be disposed on different layers. In an embodiment of the disclosure, the high frequency antenna module 632-1 may adjust a direction of a beam formed in the patch antenna array 640-1 and/or the dipole antenna array 640-2 by adjusting a phase. The patch antenna array 640-1 and/or the dipole antenna array 640-2 may include a V-pole and/or H-pole antenna so as to activate polarization MIMO. The high frequency antenna module 632-1 may include a phase shifter to change a phase and/or a modulation circuit to modulate between an mmWave signal and an IF signal.

In an embodiment of the disclosure, the RFIC 652 may be disposed in another area (for example, a second surface which is opposite to the first surface 601A) of the board 601, spaced apart from the antenna array. The RFIC 652 may process a signal of a frequency band selected, which is transmitted/received through the antenna array 640. For example, when transmitting signals, the RFIC 652 may up-convert an IF signal acquired from an IFIC (for example, the first IFIC 411 or the second IFIC 421) into an RF signal of a designated band. For example, when receiving signals, the RFIC 652 may down-convert an RF signal received through the antenna array 640 into an IF signal, and may deliver the IF signal to the IFIC.

In an embodiment of the disclosure, the PMIC 654 may be disposed on another area (for example, the second surface) of the board 601 which is spaced apart from the antenna array. The PMIC 654 may receive a voltage from a main printed circuit board (PCB) (for example, the first board 610 or the second board 620), and may provide necessary power to various components (for example, the RFIC 652) on an antenna module.

In an embodiment of the disclosure, the shielding member 602 may be disposed on a part (for example, the second surface) of the board 601 to electromagnetically shield at least one of the RFIC 652 and/or the PMIC 654. In an embodiment of the disclosure, the shielding member 602 may include a shield can and/or an epoxy molding compound.

In an embodiment of the disclosure, the high frequency antenna module 632 may be electrically connected with a printed circuit board (for example, the first board 610 and/or the second board 620) through the connector 650. The connector 650 may include, for example, a coaxial cable connector, a board-to-board connector, an interposer, or a flexible printed circuit board (FPCB). The RFIC 652 and the PMIC 654 of the high frequency antenna module 632 may be electrically connected with another printed circuit board through the connector 650.

Figure 7:
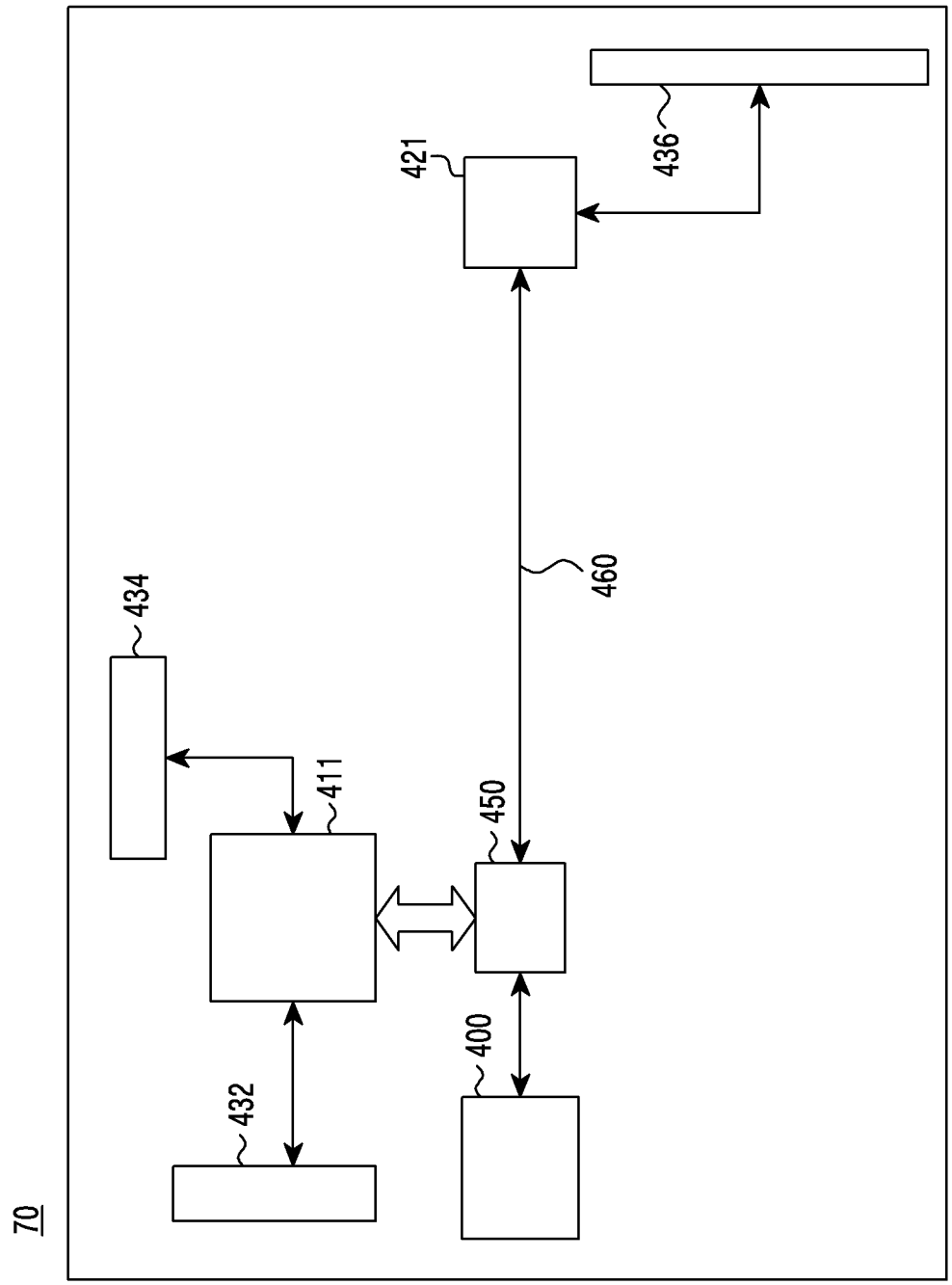
FIG. 7 is a view illustrating an electronic device according to an embodiment of the disclosure.

FIG. 7 illustrates an electronic device according to an embodiment of the disclosure.

Referring to FIG. 7, an electronic device 70 according to an embodiment may include a communication processor 400, a first switch 450, a first IFIC 411, a first antenna module 432, a second antenna module 434, a connection member 460, a second IFIC 421, and a third antenna module 436. The electronic device 70 of FIG. 7 may not include the connection part 530 (for example, a hinge), which is different from FIGS. 4, 5A, 5B, and 5C.

The communication processor 400, the first switch 450, the first IFIC 411, the first antenna module 432, the second antenna module 434, the connection member 460, the second IFIC 421, and the third antenna module 436 shown in FIG. 7 may correspond to the communication processor 400, the first switch 450, the first IFIC 411, the first antenna module 432, the second antenna module 434, the connection member 460, the second IFIC 421, and the third antenna module 436 shown in FIGS. 4, 5A, 5B, and 5C, respectively.

For example, the third antenna module 436 of the electronic device 70 may be positioned further away from the communication processor 400 than the first antenna module 432 and the second antenna module 434. For example, the third antenna module 436 may be positioned further away from the first IFIC 411 than the first antenna module 432 and the second antenna module 434. For example, a length of a transmission line connecting the communication processor 400 and the third antenna module 436 may be longer than those for the first antenna module 432 and the second antenna module 434. As the third antenna module 436 is further away from the communication processor 400 and the transmission line to the third antenna module 436 increases, a loss of a signal transmitted to the third antenna module 436 may increase more. As a frequency band increases, the loss of the signal passing through the transmission line may increase more.

The communication processor 400 according to an embodiment may transmit a digital signal or an I/Q signal of a baseband to the second IFIC 421, which is positioned at a long distance, through the connection member 460, and the second IFIC 421 may process the signal received from the communication processor 400 and provide the signal to the third antenna module 436, so that a loss occurring in the process of delivering a signal to the third antenna module 436 may be reduced.

Figure 8:
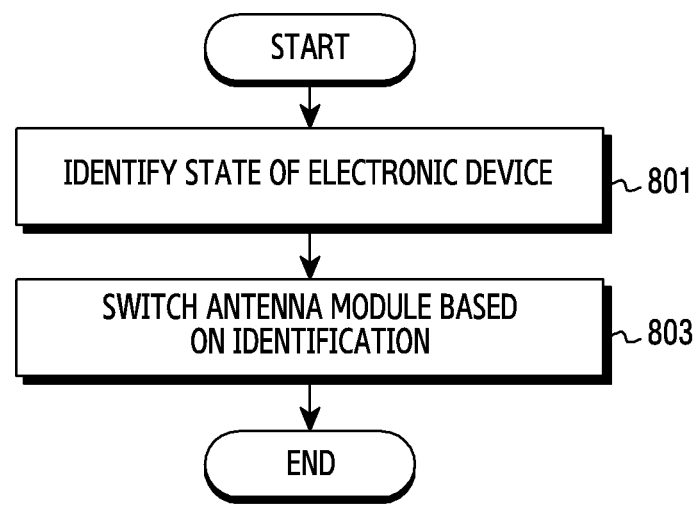
FIG. 8 is a flowchart illustrating a method of switching an antenna module in an electronic device according to an embodiment of the disclosure.

FIG. 8 is a flowchart illustrating a method of switching an antenna module in an electronic device according to an embodiment of the disclosure.

Operations of FIG. 8 may be performed by the electronic device 10 shown in FIG. 4 or the electronic device 70 shown in FIG. 7.

In explanations of FIG. 8, references are made to the electronic device 10 shown in FIG. 4, but the same or corresponding explanations are applied to the electronic device 70.

Referring to FIG. 8, in operation 801, at least one processor (for example, the communication processor 400 of FIG. 4 and/or the processor 920 of FIG. 9) of the electronic device 10 may identify a state of the electronic device 10.

Figure 9:
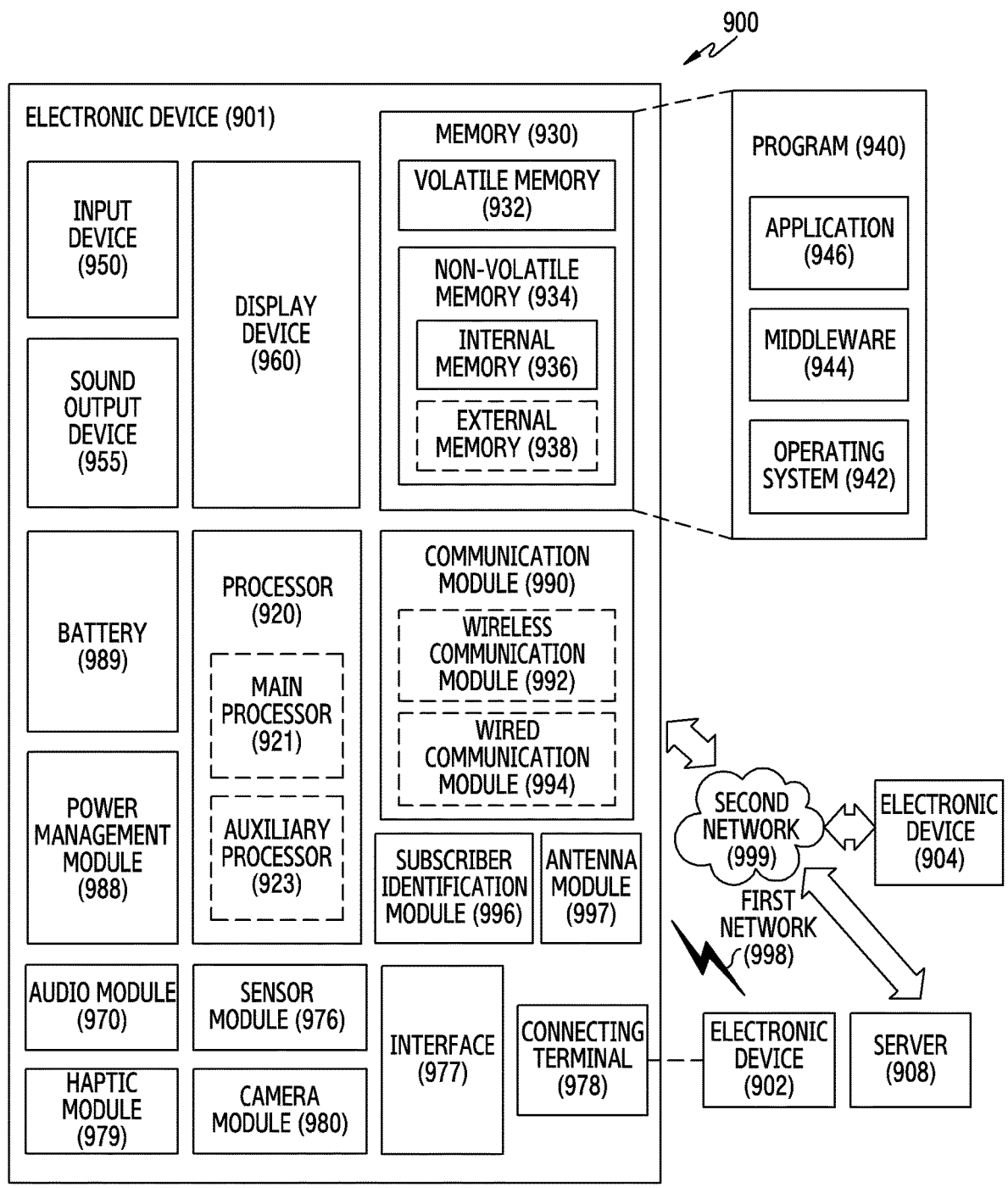
FIG. 9 is a block diagram of an electronic device in a network environment according to an embodiment of the disclosure.

For example, the processor may identify whether the electronic device 10 is in a folded state or an unfolded state through a sensor module (for example, the sensor module 976 of FIG. 9 (for example, a gyro sensor, an acceleration sensor, or a hall sensor)). The sensor module may detect a posture of the electronic device 10 and may generate data corresponding to the detected state. The sensor module may provide the generated data to the at least one processor. The processor may identify the posture of the electronic device 10, based on the provided data.

In another example, the processor may identify whether the electronic device 10 is held by a user or whether the electronic device 10 contacts user's body. The sensor module (for example, a grip sensor) may detect whether the electronic device 10 is held by the user or contacts user's body, and may generate data corresponding to the detected state. The sensor module may provide the generated data to the processor. The processor may identify whether the electronic device 10 is held by the user or contacts user's body, based on the provided data. In an embodiment of the disclosure, a portion of the housing 500 that is held by the user or contacts user's body may include portions corresponding to the first antenna module 432, the second antenna module 434, and the third antenna module 436, respectively.

In another example, the processor may detect a communication coverage of the electronic device 10. The processor may acquire data regarding respective communication performances of the first antenna module 432, the second antenna module 434, and the third antenna module 436. For example, the processor may acquire data regarding respective received signal strength indicators (RSSIs), reference signal received power (RSRP), and reference signal received quality (RSRQ) of the first antenna module 432, the second antenna module 434, and the third antenna module 436. The processor may detect respective communication coverages of the first antenna module 432, the second antenna module 434, and the third antenna module 436, based on the acquired data.

In operation 803, the at least one processor may switch an antenna based on the identified state of the electronic device 10.

For example, when it is identified that the electronic device 10 is in the folded state, the processor may inactivate any one of the second antenna module 434 and the third antenna module 436, and may activate the other one.

In another example, the processor may activate the second antenna module 434 or the third antenna module 436, based on it being identified that user's body contacts the housing 500 adjacent to the first antenna module 432. The processor may activate the first antenna module 432 or the third antenna module 436, based on it being identified that user's body contacts the housing 500 adjacent to the second antenna module 434.

In another example, the processor may change the activated antenna module, based on the detected communication coverage. In an embodiment of the disclosure, when user's body contacts an area of the housing 500 of the electronic device 10 that is adjacent to the first antenna module 432, the communication coverage of the first antenna module 432 may be reduced. When the communication coverage of the first antenna module 432 is reduced to be lower than the second antenna module 434 or the third antenna module 436, the processor may inactivate the first antenna module 432 and may activate the second antenna module 434 or the third antenna module 436. In the same way as described above, based on the communication coverage, the processor may inactivate the second antenna module 434 and may activate the first antenna module 432 or the third antenna module 436, or may inactivate the third antenna module 436 and may activate the first antenna module 432 or the second antenna module 434.

In another example, in the folded state of the electronic device 10, the second antenna module 434 and the third antenna module 436 may be close to each other, and accordingly, the communication coverages of the second antenna module 434 and the third antenna module 436 may be reduced. In this case, the processor may inactivate any one of the second antenna module 434 and the third antenna module 436, and may activate the other one.

According to various embodiment as described above, an electronic device (for example, the electronic device 10 of FIG. 4) may include: a first part (for example, the first part 510 of FIG. 4), a second part (for example, the second part 520 of FIG. 4), a connection part (for example, the connection part 530 of FIG. 4) disposed between the first part and the second part and coupled to the first part and the second part such that the first part and the second part to rotatable, a first antenna module (for example, the first antenna module 432 of FIG. 4) disposed in the first part and including an antenna array, a second antenna module (for example, the third antenna module 436 of FIG. 4) disposed in the second part and including an antenna array, at least one processor (for example, the communication processor 400 of FIG. 4) disposed in the first part, a first intermediate frequency integrated circuit (IFIC) (for example, the first IFIC 411 of FIG. 4) disposed in the first part and electrically connected with the first antenna module and the at least one processor, a second IFIC (for example, the second IFIC 421 of FIG. 4) disposed in the second part and electrically connected with the second antenna module and the at least one processor, and a flexible printed circuit board (FPCB) (for example, the connection member 460 of FIG. 4) disposed over the first part, the connection part, and the second part, and configured to deliver a digital signal or an I/Q signal of a baseband between the at least one processor and the second IFIC.

In an embodiment of the disclosure, the at least one processor may be configured to: generate a digital signal based on data, and transmit the generated digital signal to the second IFIC through the FPCB.

In an embodiment of the disclosure, the at least one processor may be configured to, by using the second IFIC, convert the transmitted digital signal into an I/Q signal of a baseband, up-convert the I/Q signal of the baseband into a signal having a first designated frequency which is higher than the baseband, and transmit the signal having the designated frequency to the second antenna module.

In an embodiment of the disclosure, the at least one processor may be configured to, by using the second antenna module, up-convert the signal having the first designated frequency into a signal having a second designated frequency which is higher than the first designated frequency, and transmit the signal having the second designated frequency through the antenna array of the second antenna module.

In an embodiment of the disclosure, the first designated frequency may be 9 GHz to 11 GHz, and the second designated frequency may be 11 GHz to 60 GHz.

In an embodiment of the disclosure, the at least one processor may be configured t: generate a digital signal based on data, acquire an I/Q signal of a baseband by modulating the digital signal; and transmit the I/Q signal of the baseband acquired to the second IFIC through the FPCB.

In an embodiment of the disclosure, the at least one processor may be configured to, by using the second IFIC, up-convert the I/Q signal of the baseband into a signal having a designated frequency which is higher than the baseband, and transmit the signal having the designated frequency to the second antenna module.

In an embodiment of the disclosure, in an unfolded state of the electronic device, the second antenna module may be disposed further away from the at least one processor than the first antenna module.

In an embodiment of the disclosure, in an unfolded state of the electronic device, the second antenna module may be closer to the second IFIC than to the first IFIC.

In an embodiment of the disclosure, the electronic device may include a switch circuit (for example, the first switch 450 of FIG. 4) which is disposed in the first part and is electrically connected with the first IFIC, the second IFIC, and the at least one processor, and the at least one processor may be configured to be electrically connected with the first IFIC or the second IFIC through the switch circuit.

In an embodiment of the disclosure, the first IFIC may include a switch circuit (for example, the first switch 450 of FIG. 5C), the second IFIC may be electrically connected with the switch circuit, and the at least one processor may be configured to be electrically connected with the first IFIC or the second IFIC through the switch circuit.

In an embodiment of the disclosure, the at least one processor may be configured to detect communication coverages of the first antenna module and the second antenna module (for example, operation 801 of FIG. 8), and, based on the detection, inactivate the first antenna module or the second antenna module and activate the second antenna module or the first antenna module (for example, operation 803 of FIG. 8).

In an embodiment of the disclosure, the electronic device may include a first printed circuit board (for example, the first board 610 of FIG. 4) disposed in the first part, and a second printed circuit board (for example, the second board 620 of FIG. 4) disposed in the second part, the FPCB may be connected to the first printed circuit board and the second printed circuit board, the at least one processor and the first IFIC may be disposed on the first printed circuit board, and the second IFIC may be disposed on the first printed circuit board.

In an embodiment of the disclosure, the electronic device may include a third antenna module (for example, the second antenna module 434 of FIG. 4) disposed in the first part and electrically connected with the first IFIC, the first antenna module may be disposed adjacent to a first periphery of a side surface of the first part to face a rear surface of the first part, the third antenna module may be disposed adjacent to a second periphery to face the second periphery of the side surface of the first part that is extended in a direction substantially perpendicular to the first periphery, the second antenna module may be disposed adjacent to a third periphery to face the third periphery of a side surface of the second part, and the second periphery and the third periphery may be opposite each other with reference to the connection part in an unfolded state of the electronic device.

In an embodiment of the disclosure, the second antenna module may include a board (for example, the board 601 of FIG. 6A) including a plurality of layers where conductive layers and nonconductive layers are stacked while alternating with each other, a radio frequency integrated circuit (RFIC) (for example, the RFIC 652 of FIG. 6A) formed on a first conductive layer among the plurality of layers of the board, and a shielding layer (for example, the shielding member 602 of FIG. 6A) enclosing the RFIC, and the antenna array of the second antenna module may be formed on a second conductive layer among the plurality of layers of the board.

According to various embodiments as described above, an electronic device (for example, the electronic device 10 of FIG. 4) may include a first part (for example, the first part 510 of FIG. 4), a second part (for example, the second part 520 of FIG. 4), a connection part (for example, the connection part 530 of FIG. 4) disposed between the first part and the second part and coupled to the first part and the second part such that the first part and the second part are rotatable, a first antenna module (for example, the first antenna module 432 of FIG. 4) disposed in the first part, a second antenna module (for example, the third antenna module 436 of FIG. 4) disposed in the second part, a communication processor (for example, the communication processor 400 of FIG. 4) disposed in the first part, a first intermediate frequency integrated circuit (IFIC) (for example, the first IFIC 411 of FIG. 4) disposed in the first part and electrically connected with the first antenna module and the communication processor, a second IFIC (for example, the second IFIC 421 of FIG. 4) disposed in the second part and electrically connected with the second antenna module and the first IFIC, and an FPCB (for example, the connection member 460 of FIG. 4) disposed over the first part, the connection part, and the second part, and configured to deliver a digital signal or an I/Q signal of a baseband between the first IFIC and the second IFIC.

In an embodiment of the disclosure, the communication processor may be configured to acquire data based on a digital signal transmitted from the second IFIC through the FPCB.

In an embodiment of the disclosure, the communication processor may be configured to acquire a digital signal based on an I/Q signal of a baseband transmitted from the second IFIC through the FPCB, and to acquire data based on the digital signal.

In an embodiment of the disclosure, the first IFIC may include a first switch circuit (for example, the first switch 450 of FIG. 4) electrically connected with the communication processor, and the communication processor may be configured to be connected with the first IFIC or the second IFIC through the switch circuit.

In an embodiment of the disclosure, the electronic device may include a third antenna module (for example, the second antenna module 434 of FIG. 4) disposed in the first part and electrically connected with the first IFIC, and the first IFIC may include a second switch circuit (for example, the second switch 412 of FIG. 5A) connected with the third antenna module, and the communication processor may be configured to be connected with the first antenna module or the second antenna module by using the second switch circuit.

FIG. 9 is a block diagram illustrating an electronic device in a network environment according to an embodiment of the disclosure.

Referring to FIG. 9, an electronic device 901 in a network environment 900 may communicate with an external electronic device 902 via a first network 998 (e.g., a short-range wireless communication network), or an external electronic device 904 or a server 908 via a second network 999 (e.g., a long-range wireless communication network). According to an embodiment of the disclosure, the electronic device 901 may communicate with the external electronic device 904 via the server 908. According to an embodiment of the disclosure, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments of the disclosure, at least one (e.g., the display device 960 or the camera module 980) of the components may be omitted from the electronic device 901, or one or more other components may be added in the electronic device 901. In some embodiments of the disclosure, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment of the disclosure, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment of the disclosure, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment of the disclosure, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment of the disclosure, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment of the disclosure, the audio module 970 may obtain the sound via the input device 950, or output the sound via the sound output device 955 or a headphone of an external electronic device (e.g., the external electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment of the disclosure, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the external electronic device 902) directly (e.g., wiredly) or wirelessly. According to an embodiment of the disclosure, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the external electronic device 902). According to an embodiment of the disclosure, the connecting terminal 978 may include, for example, a HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 979 may include, for example, a motor, a piezoelectric element, or an electric stimulator.

The camera module 980 may capture a still image or moving images. According to an embodiment of the disclosure, the camera module 980 may include one or more lenses, image sensors, image signal processors, or flashes.

The power management module 988 may manage power supplied to the electronic device 901. According to one embodiment of the disclosure, the power management module 988 may be implemented as at least part of, for example, a power management integrated circuit (PMIC).

The battery 989 may supply power to at least one component of the electronic device 901. According to an embodiment of the disclosure, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the external electronic device 902, the external electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment of the disclosure, the communication module 990 may include a wireless communication module 992 (e.g., a cellular communication module, a short-range wireless communication module, or a global navigation satellite system (GNSS) communication module)

or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment of the disclosure, the antenna module 997 may include an antenna including a radiating element including a conductive material or a conductive pattern formed in or on a substrate (e.g., PCB). According to an embodiment of the disclosure, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment of the disclosure, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 901 and the external electronic device 904 via the server 908 coupled with the second network 999. Each of the external electronic devices 902 and 904 may be a device of a same type as, or a different type, from the electronic device 901. According to an embodiment of the disclosure, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
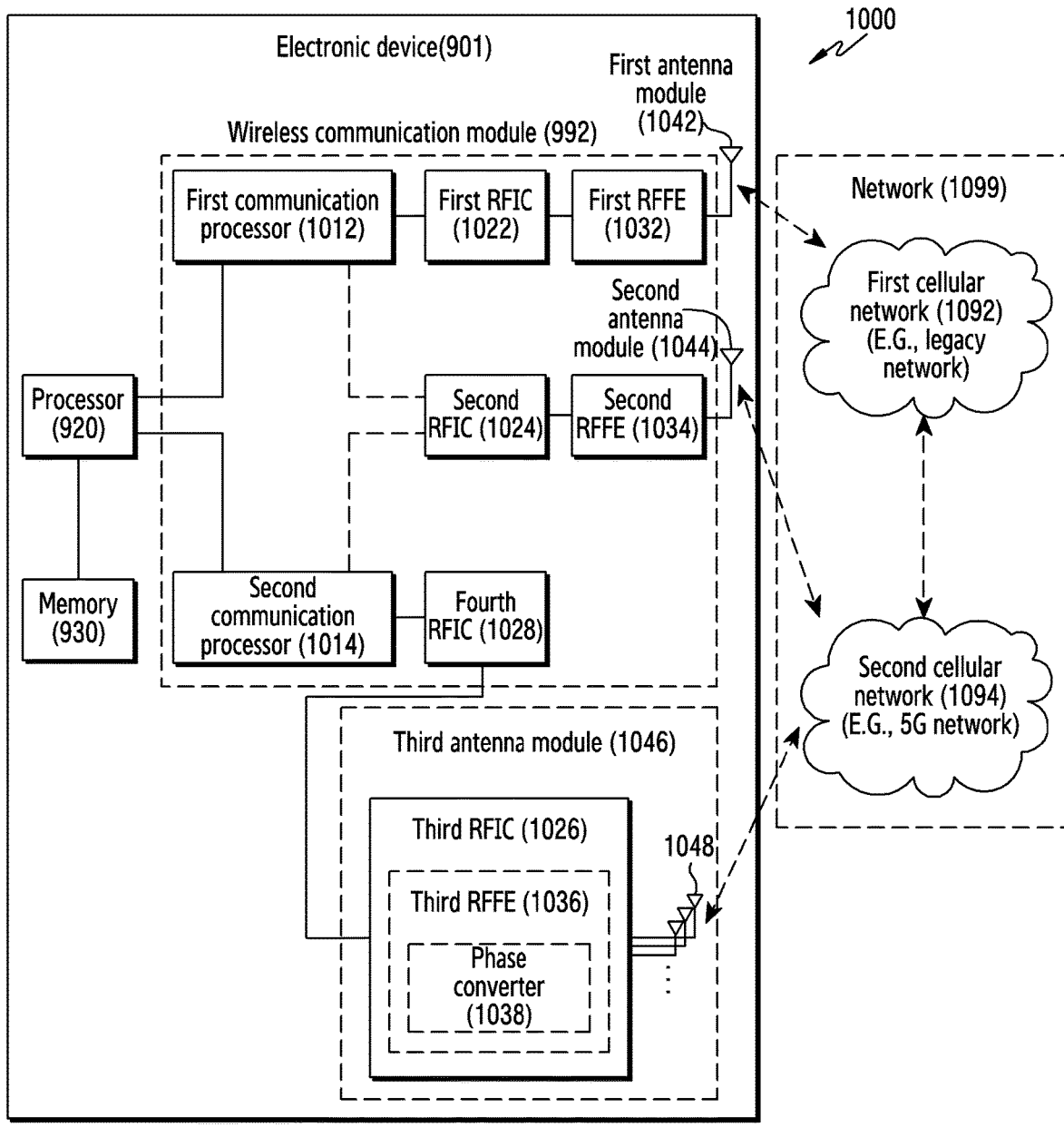
FIG. 10 is a block diagram of an electronic device for supporting legacy network communication and 5G network communication according to an embodiment of the disclosure.

FIG. 10 is a block diagram 1000 illustrating an electronic device in a network environment including a plurality of cellular networks according to an embodiment of the disclosure.

Referring to FIG. 10, an electronic device 901 may include a first communication processor 1012, a second communication processor 1014 (e.g., communication processor 400), a first radio frequency integrated circuit (RFIC) 1022, a second RFIC 1024, a third RFIC 1026, a fourth RFIC 1028, a first radio frequency front end (RFFE) 1032, a second RFFE 1034, a first antenna module 1042, a second antenna module 1044, and an antenna 1048. The electronic device 901 may further include a processor 920 and a memory 930. The second network 999 may include a first cellular network 1092 and a second cellular network 1094. According to another embodiment of the disclosure, the electronic device 901 may further include at least one of the parts shown in FIG. 9 and the second network 999 may further include at least one another network. According to an embodiment of the disclosure, the first communication processor 1012, the second communication processor 1014, the first RFIC 1022, the second RFIC 1024, the fourth RFIC 1028, the first RFFE 1032, and the second RFFE 1034 may form at least a portion of a wireless communication module 992. According to another embodiment of the disclosure, the fourth RFIC 1028 may be omitted or may be included as a portion of the third RFIC 1026.

The first communication processor 1012 can support establishment of a communication channel with a band to be used for wireless communication with the first cellular network 1092 and legacy network communication through the established communication channel According to various embodiments of the disclosure, the first cellular network may be a legacy network including a $2^{nd}$ generation (2G), $3^{rd}$ generation (3G), $4^{th}$ generation (4G), or Long-Term Evolution (LTE) network. The second communication processor 1014 can support establishment of a communication channel corresponding to a designated band (e.g., about 6 GHz-~about 60 GHz) of a band to be used for wireless communication with the second cellular network 1094 and 5G network communication through the established communication channel According to various embodiments of the disclosure, the second cellular network 1094 may be a 5G network that is defined in 3GPP. Further, according to an embodiment of the disclosure, the first communication processor 1012 or the second communication processor 1014 can support establishment of a communication channel corresponding to another designated band (e.g., about 6 GHz or less) of a band to be used for wireless communication with the second cellular network 1094 and 5G network communication through the established communication channel According to an embodiment of the disclosure, the first communication processor 1012 and the second communication processor 1014 may be implemented in a single chip or a single package. According to various embodiments of the disclosure, the first communication processor 1012 or the second communication processor 1014 may be disposed in a single chip or a single package together with the processor 920, the auxiliary processor 923, or the communication module 990. According to an embodiment of the disclosure, the first communication processor 1012 and the second communication processor 1014 is directly or indirectly connected by an interface (not shown), thereby being able to provide or receive data or control signal in one direction or two directions.

The first RFIC 1022, in transmission, can converts a baseband signal generated by the first communication processor 1012 into a radio frequency (RF) signal of about 700 MHz to about 3 GHz that is used for the first cellular network 1092 (e.g., a legacy network). In reception, an RF signal can be obtained from the first cellular network 1092 (e.g., a legacy network) through an antenna (e.g., the first antenna module 1042) and can be preprocessed through an RFFE (e.g., the first RFFE 1032). The first RFIC 1022 can covert the preprocessed RF signal into a baseband signal so that the preprocessed RF signal can be processed by the first communication processor 1012.

The second RFIC 1024 can convert a baseband signal generated by the first communication processor 1012 or the second communication processor 1014 into an RF signal in a Sub6 band (e.g., about 6 GHz or less) (hereafter, 5G Sub6 RF signal) that is used for the second cellular network 1094 (e.g., a 5G network). In reception, a 5G Sub6 RF signal can be obtained from the second cellular network 1094 (e.g., a 5G network) through an antenna (e.g., the second antenna module 1044) and can be preprocessed through an RFFE (e.g., the second RFFE 1034). The second RFIC 1024 can convert the processed 5G Sub6 RF signal into a baseband signal so that the processed 5G Sub6 RF signal can be processed by a corresponding communication processor of the first communication processor 1012 or the second communication processor 1014.

The third RFIC 1026 can convert a baseband signal generated by the second communication processor 1014 into an RF signal in a 5G Above6 band (e.g., about 6 GHz~about 60 GHz) (hereafter, 5G Above6 RF signal) that is used for the second cellular network 1094 (e.g., a 5G network). In reception, a 5G Above6 RF signal can be obtained from the second cellular network 1094 (e.g., a 5G network) through an antenna (e.g., the antenna 1048) and can be preprocessed through the third RFFE 1036. The third RFIC 1026 can covert the preprocessed 5G Above6 RF signal into a baseband signal so that the preprocessed 5G Above6 RF signal can be processed by the first communication processor 1014. According to an embodiment of the disclosure, the third RFFE 1036 may be provided as a portion of the third RFIC 1026.

The electronic device 901, according to an embodiment of the disclosure, may include a fourth RFIC 1028 separately from or as at least a portion of the third RFIC 1026. In this case, the fourth RFIC 1028 can convert a baseband signal generated by the second communication processor 1014 into an RF signal in an intermediate frequency band (e.g., about 9 GHz~about 11 GHz) (hereafter, IF signal), and then transmit the IF signal to the third RFIC 1026. The third RFIC 1026 can convert the IF signal into a 5G Above6 RF signal. In reception, a 5G Above6 RF signal can be received from the second cellular network 1094 (e.g., a 5G network) through an antenna (e.g., the antenna 1048) and can be converted into an IF signal by the third RFIC 1026. The fourth RFIC 1028 can covert the IF signal into a baseband signal so that IF signal can be processed by the second communication processor 1014.

According to an embodiment of the disclosure, the first RFIC 1022 and the second RFIC 1024 may be implemented as at least a portion of a single chip or a single package. According to an embodiment of the disclosure, the first RFFE 1032 and the second RFFE 1034 may be implemented as at least a portion of a single chip or a single package. According to an embodiment of the disclosure, at least one of the first antenna module 1042 or the second antenna module 1044 may be omitted, or may be combined with another antenna module and can process RF signals in a plurality of bands.

According to an embodiment of the disclosure, the third RFIC 1026 and the antenna 1048 may be disposed on a substrate, thereby being able to form a third antenna module 1046. For example, the wireless communication module 992 or the processor 920 may be disposed on a first substrate (e.g., a main PCB). In this case, the third RFIC 1026 may be disposed in a partial area (e.g., the bottom) and the antenna 1048 may be disposed in another partial area (e.g., the top) of a second substrate (e.g., a sub PCB) that is different from the first substrate, thereby being able to form the third antenna module 1046. By disposing the third RFIC 1026 and the antenna 1048 on the same substrate, it is possible to reduce the length of the transmission line therebetween. Accordingly, it is possible to reduce a loss (e.g., attenuation) of a signal in a high-frequency band (e.g., about 6 GHz-~about 60 GHz), for example, which is used for 5G network communication, due to a transmission line. Accordingly, the electronic device 901 can improve the quality and the speed of communication with the second cellular network 1094 (e.g., 5G network).

According to an embodiment of the disclosure, the antenna 1048 may be an antenna array including a plurality of antenna elements that can be used for beamforming. In this case, the third RFIC 1026, for example, as a portion of the third RFFE 1036, may include a plurality of phase shifters 1038 corresponding to the antenna elements. In transmission, the phase shifters 1038 can convert the phase of a 5G Above6 RF signal to be transmitted to the outside of the electronic device 901 (e.g., to a base station of a 5G network) through the respectively corresponding antenna elements. In reception, the phase shifters 1038 can convert the phase of a 5G Above6 RF signal received from the outside through the respectively corresponding antenna element into the same or substantially the same phase. This activates transmission or reception through beamforming between the electronic device 901 and the outside.

The second cellular network 1094 (e.g., a 5G network) may be operated independently from (e.g., Stand-Along (SA)) or connected and operated with (e.g., Non-Stand Along (NSA)) the first cellular network 1092 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 901 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 1030 and accessed by another part (e.g., the processor 920, the first communication processor 1012, or the second communication processor 1014).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 940) including one or more instructions that are stored in a storage medium (e.g., an internal memory 936 or an external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Effects obtainable in the disclosure are not limited to the above-mentioned effects, and other effects not mentioned may be clearly understood by those of ordinary skill in the art to which the disclosure belongs from the description below.

Methods according to the embodiments described in the claims or specifications of the disclosure may be implemented in the form of hardware, software, or a combination of hardware and software.

When implemented in software, a computer-readable storage medium storing one or more programs (software modules) may be provided. One or more programs stored in the computer-readable storage medium are configured to be executable by one or more processors in an electronic device (device). One or more programs include instructions for causing an electronic device to execute methods according to embodiments described in a claim or specification of the disclosure.

Such programs (software modules, software) may be stored in a random access memory, non-volatile memory including flash memory, read only memory (ROM), electrically erasable programmable ROM (electrically erasable programmable read only memory, EEPROM), magnetic disc storage device, compact disc-ROM (CD-ROM), digital versatile discs (DVDs), or other optical storage device, a magnetic cassette. Alternatively, it may be stored in a memory including a combination of some or all thereof. In addition, each configuration memory may be included in plurality.

In addition, the program may be stored in an attachable storage device that can be accessed through a communication network consisting of a communication network such as the Internet, an intranet, a local area network (LAN), a wide area network (WAN), or a storage area network (SAN), or a combination thereof. Such a storage device may be connected to a device implementing an embodiment of the disclosure through an external port. In addition, a separate storage device on the communication network may be connected to the device implementing the embodiment of the disclosure.

While has been shown and described in the detailed with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first part;
a second part;
a connection part disposed between the first part and the second part and coupled to the first part and the second part such that the first part and the second part are rotatable;
a first antenna module disposed in the first part and comprising an antenna array;
a second antenna module disposed in the second part and comprising an antenna array;
at least one processor disposed in the first part;
a first intermediate frequency integrated circuit (IFIC) disposed in the first part and electrically connected with the first antenna module and the at least one processor;
a second IFIC disposed in the second part and electrically connected with the second antenna module and the at least one processor; and
a flexible printed circuit board (FPCB) disposed over the first part, the connection part, and the second part, and configured to deliver a digital signal or an in-phase quadrature (I/Q) signal of a baseband between the at least one processor and the second IFIC.

2. The electronic device of claim 1, wherein the at least one processor is further configured to:
generate a digital signal based on data, and
transmit the generated digital signal to the second IFIC through the FPCB.

3. The electronic device of claim 2, wherein the second IFIC is configured to:
convert the transmitted digital signal into a first I/Q signal of a baseband,
up-convert the first I/Q signal of the baseband into a signal having a first designated frequency which is higher than the baseband, and
transmit the signal having the first designated frequency to the second antenna module.

4. The electronic device of claim 3, wherein a radio frequency integrated circuit (RFIC) included in the second antenna module is configured to:
up-convert the signal having the first designated frequency into a signal having a second designated frequency which is higher than the first designated frequency, and
transmit the signal having the second designated frequency through the antenna array of the second antenna module.

5. The electronic device of claim 4,
wherein the first designated frequency is 9 gigahertz (GHz) to 11 GHz, and
wherein the second designated frequency is 11 GHz to 60 GHz.

6. The electronic device of claim 1, wherein the at least one processor is further configured to:
generate a digital signal based on data,
acquire a first I/Q signal of a baseband by modulating the generated digital signal, and
transmit the first I/Q signal of the baseband to the second IFIC through the FPCB.

7. The electronic device of claim 6, wherein the second IFIC is configured to:
up-convert the first I/Q signal of the baseband into a signal having a designated frequency which is higher than the baseband, and
transmit the signal having the designated frequency to the second antenna module.

8. The electronic device of claim 1, wherein, in an unfolded state of the electronic device, the second antenna module is disposed further away from the at least one processor than the first antenna module.

9. The electronic device of claim 1, wherein, in an unfolded state of the electronic device, the second antenna module is closer to the second IFIC than to the first IFIC.

10. The electronic device of claim 1, further comprising:
a switch circuit which is disposed in the first part and is electrically connected with the first IFIC, the second IFIC, and the at least one processor,
wherein the at least one processor is configured to be electrically connected with the first IFIC or the second IFIC through the switch circuit.

11. The electronic device of claim 1,
wherein the first IFIC comprises a switch circuit,
wherein the second IFIC is electrically connected with the switch circuit, and
wherein the at least one processor is configured to be electrically connected with the first IFIC or the second IFIC through the switch circuit.

12. The electronic device of claim 1, wherein the at least one processor is configured to:
detect communication coverages of the first antenna module and the second antenna module, and
based on detection of the communication coverages:
inactivate the first antenna module and activate the second antenna module, or
inactivate the second antenna module and activate the first antenna module.

13. The electronic device of claim 1, further comprising:
a first printed circuit board disposed in the first part; and
a second printed circuit board disposed in the second part,
wherein the FPCB is connected to the first printed circuit board and the second printed circuit board,
wherein the at least one processor and the first IFIC are disposed on the first printed circuit board, and
wherein the second IFIC is disposed on the first printed circuit board.

14. The electronic device of claim 1, further comprising:
a third antenna module disposed in the first part and electrically connected with the first IFIC,
wherein the first antenna module is disposed adjacent to a first periphery of a side face of the first part to face a rear face of the first part,
wherein the third antenna module is disposed adjacent to a second periphery of the side face of the first part to face the second periphery that is extended in a direction substantially perpendicular to the first periphery,
wherein the second antenna module is disposed adjacent to a third periphery of a side face of the second part to face the third periphery, and
wherein the second periphery and the third periphery are opposite each other with reference to the connection part in an unfolded state of the electronic device.

15. The electronic device of claim 1,
wherein the second antenna module comprises:
a board comprising a plurality of layers in which conductive layers and nonconductive layers are included,
a radio frequency integrated circuit (RFIC) is disposed on a first conductive layer among the plurality of layers of the board, and a shielding layer enclosing the RFIC, and
wherein the antenna array of the second antenna module is disposed on a second conductive layer among the plurality of layers of the board.

16. An electronic device comprising:
a first part;
a second part;
a connection part disposed between the first part and the second part and coupled to the first part and the second part such that the first part and the second part are rotatable;
a first antenna module disposed in the first part;
a second antenna module disposed in the second part;
a communication processor disposed in the first part;
a first intermediate frequency integrated circuit (IFIC) disposed in the first part and electrically connected with the first antenna module and the communication processor;
a second IFIC disposed in the second part and electrically connected with the second antenna module and the first IFIC; and
a flexible printed circuit board (FPCB) disposed over the first part, the connection part, and the second part, and configured to deliver a digital signal or an in-phase quadrature (I/Q) signal of a baseband between the communication processor and the second IFIC.

17. The electronic device of claim 16, wherein the communication processor is configured to:
obtain data based on a digital signal transmitted form the second IFIC through the FPCB.

18. The electronic device of claim 16, wherein the communication processor is configured to:
obtain a digital signal based on an I/Q signal of a baseband transmitted from the second IFIC through the FPCB, and
obtain data based on the obtained digital signal.

19. The electronic device of claim 16,
wherein the first IFIC includes a first switch circuit electrically connected to the communication processor, and
wherein the communication processor is connected to the first IFIC or the second IFIC through the first switch circuit.

20. The electronic device of claim 19, further comprising:
a third antenna module electrically connected to the first IFIC and disposed in the first part,
wherein the first IFIC includes a second switch circuit electrically connected to the third antenna module, and
wherein the communication processor is connected to the first antenna module or the second antenna module through the second switch circuit.

* * * * *